Jan. 4, 1949.  E. BUHLER ET AL  2,458,339
MACHINE ADAPTED FOR TYPING CHINESE IDEOGRAPHS
Filed May 3, 1946  20 Sheets-Sheet 7
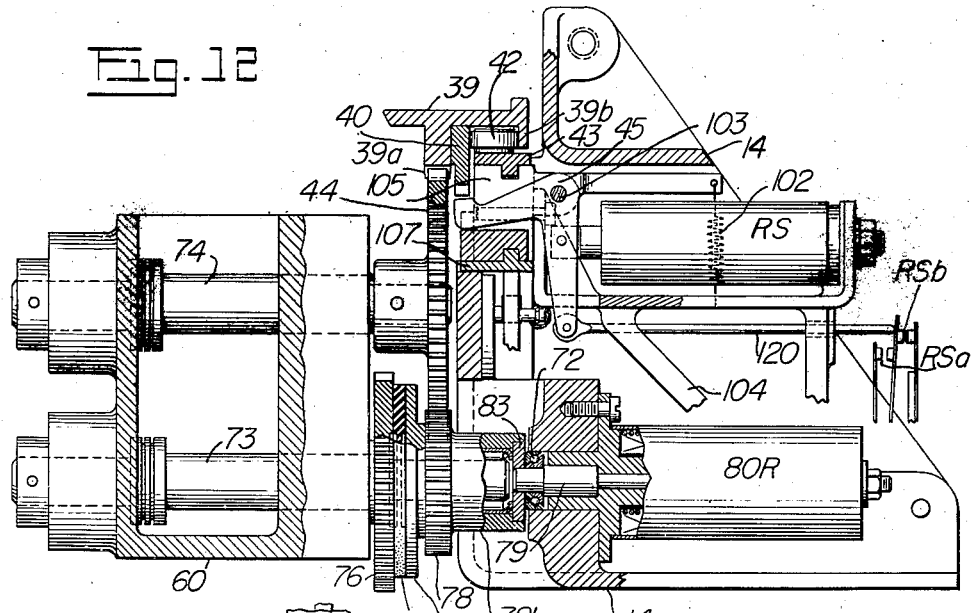
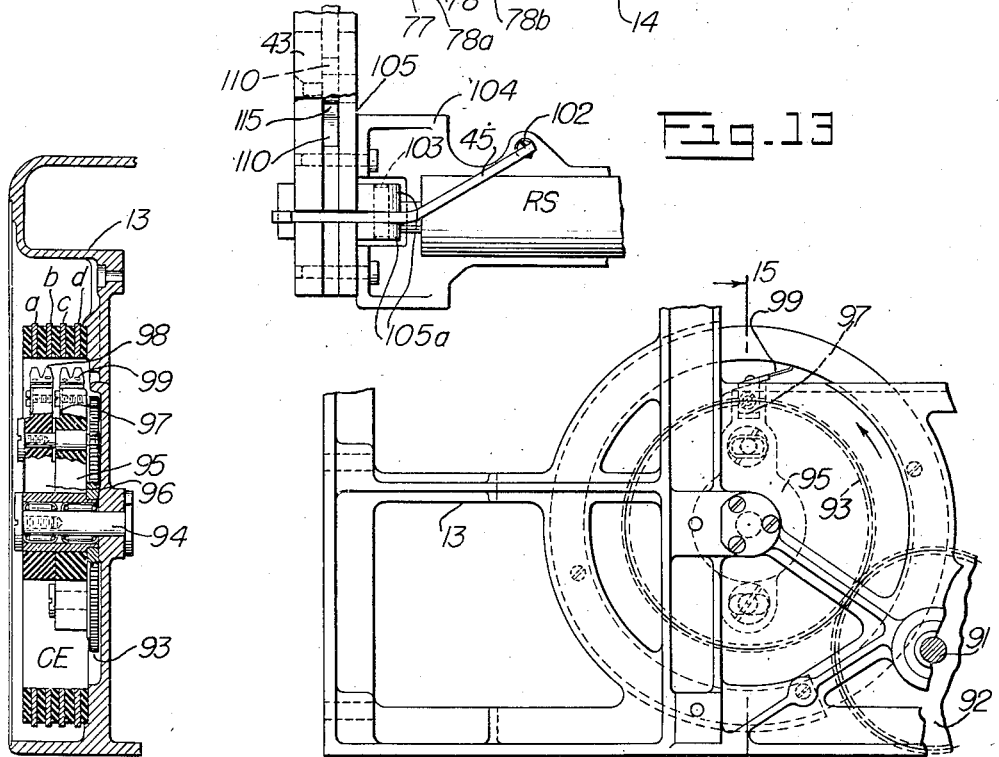
INVENTORS
EUGEN BUHLER
C. A. BERRY
BY
ATTORNEY Jan. 4, 1949.   E. BUHLER ET AL   2,458,339
MACHINE ADAPTED FOR TYPING CHINESE IDEOGRAPHS
Filed May 3, 1946   20 Sheets-Sheet 8
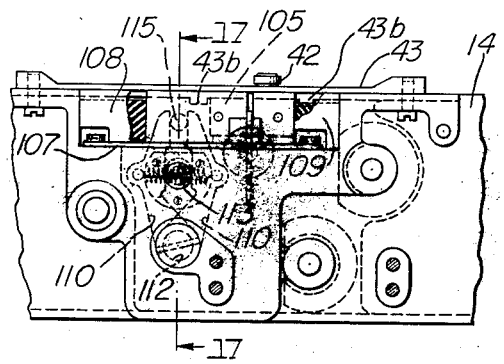
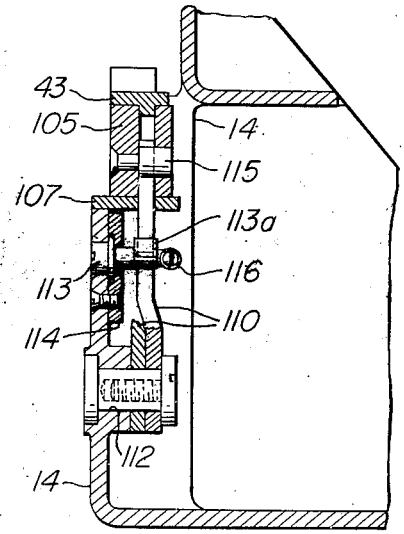
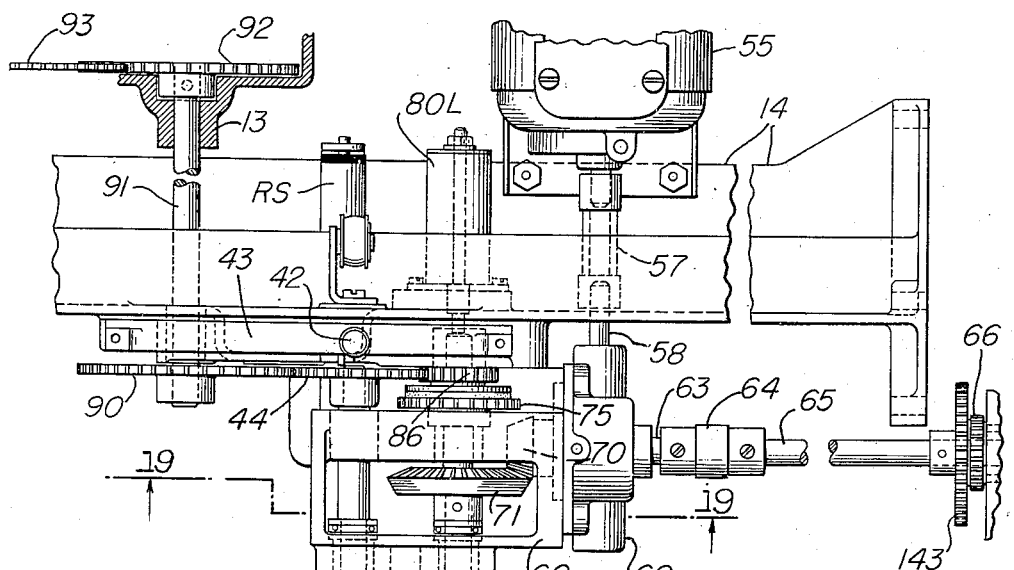
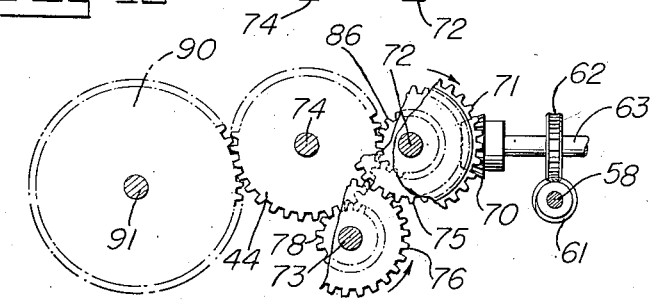
INVENTORS
EUGEN BUHLER
C.A. BERRY
BY
ATTORNEY

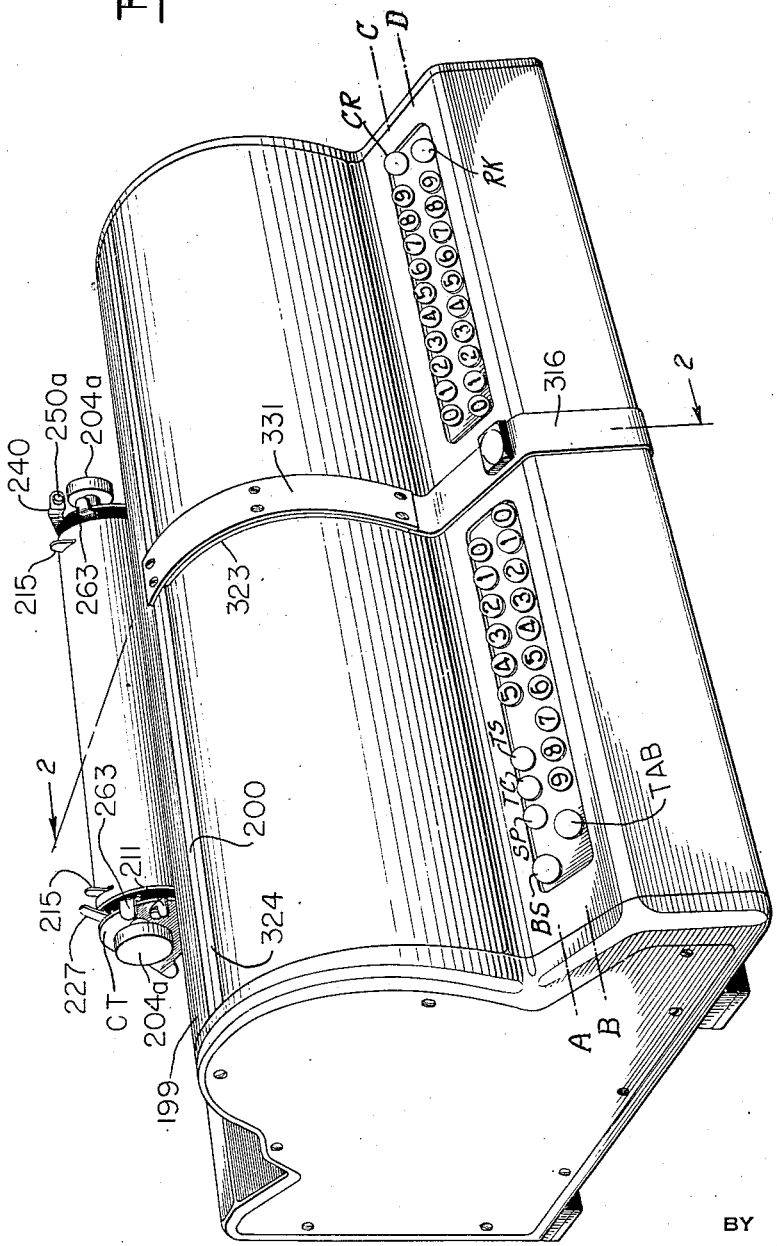

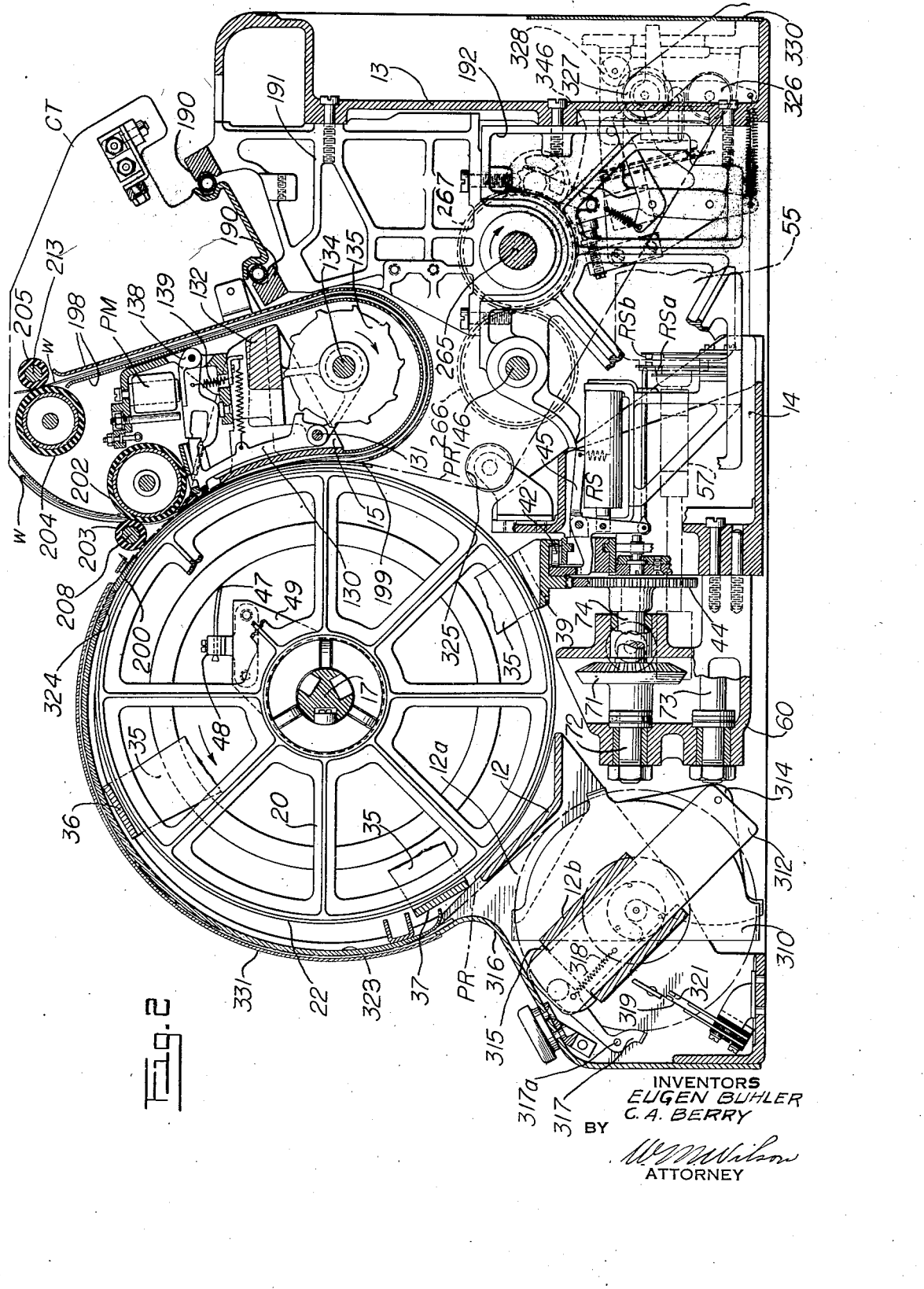

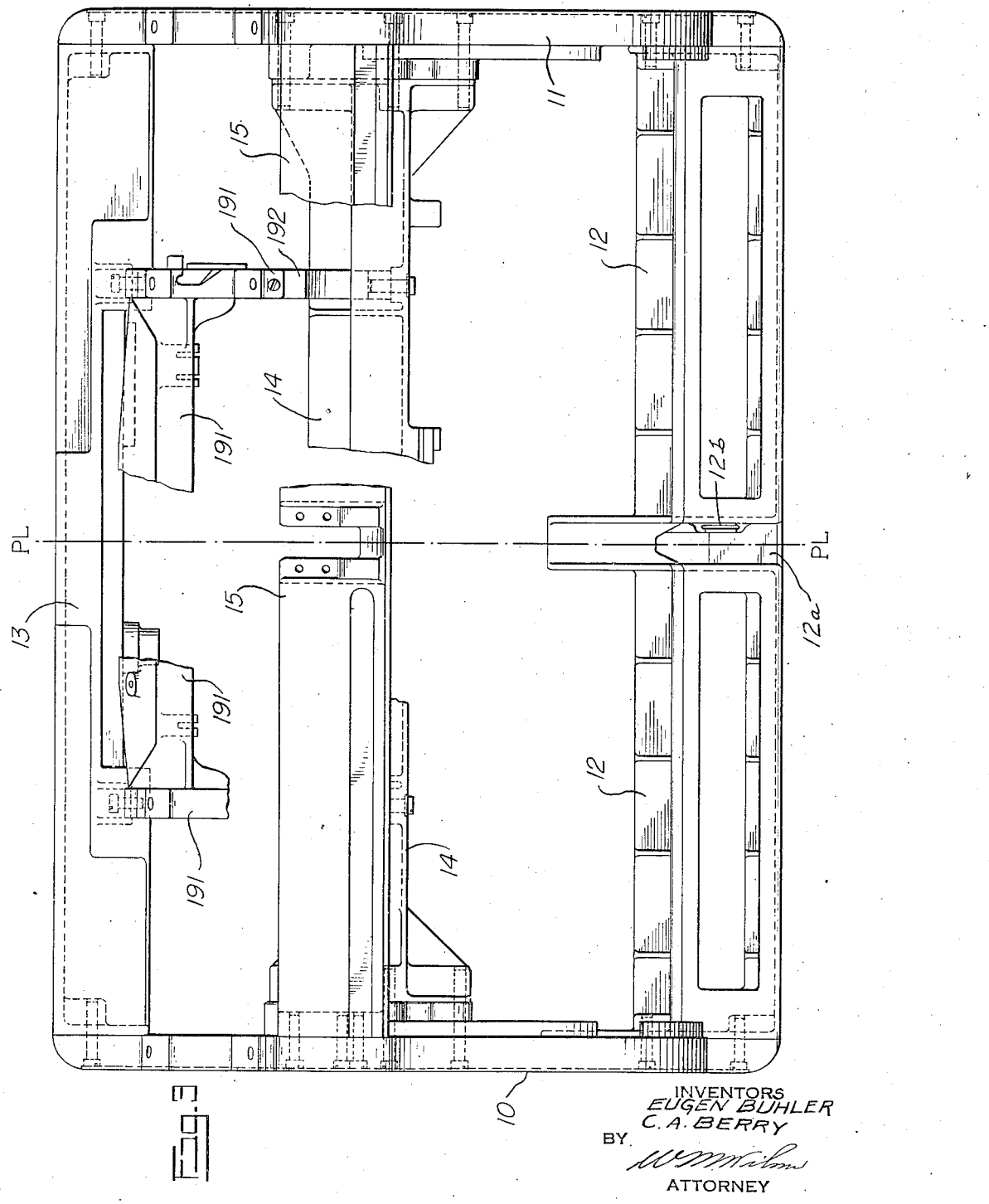

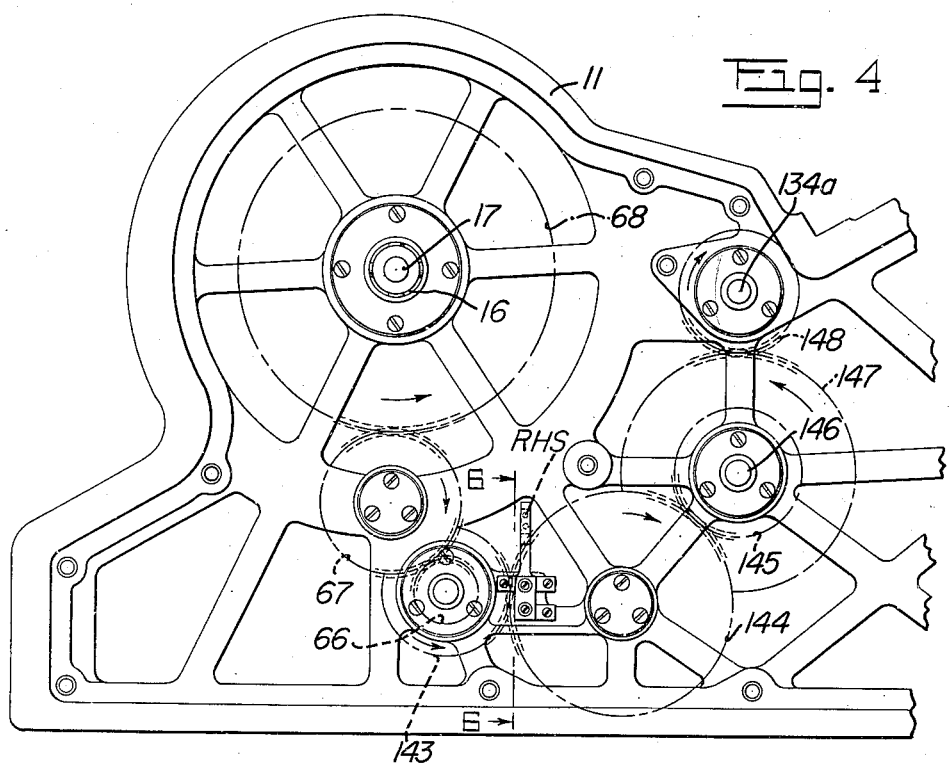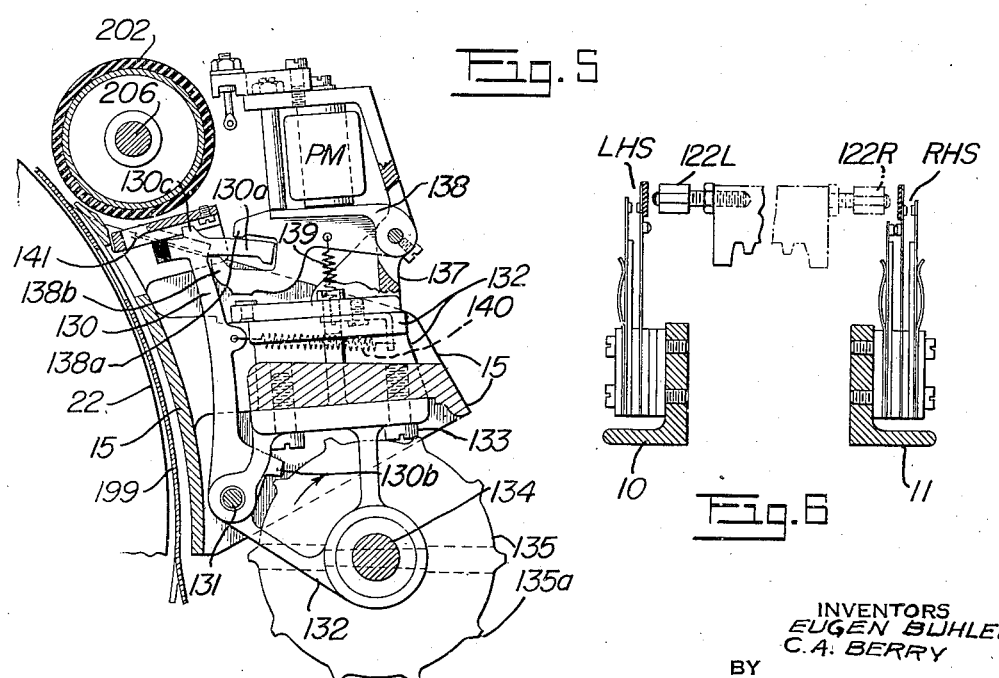

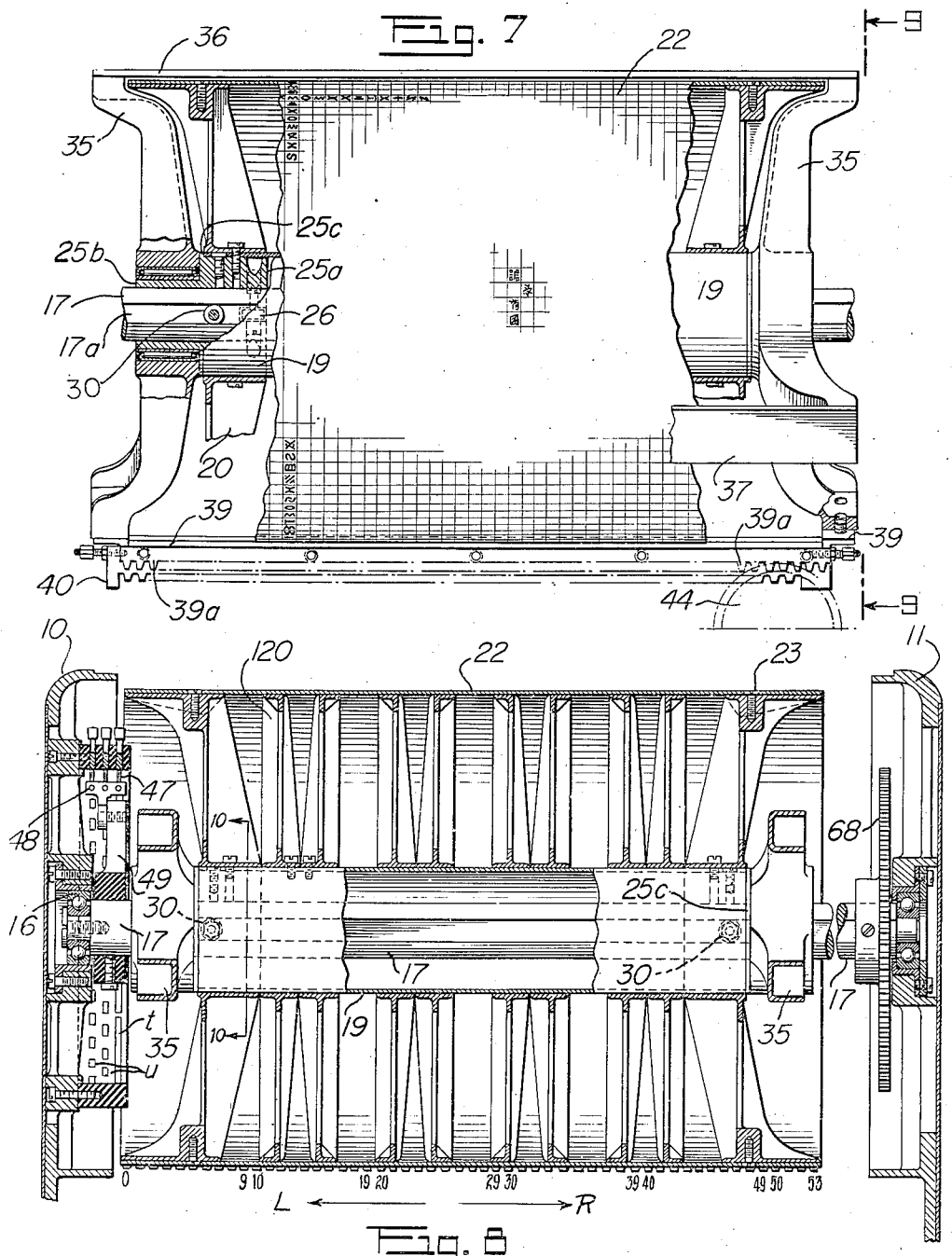

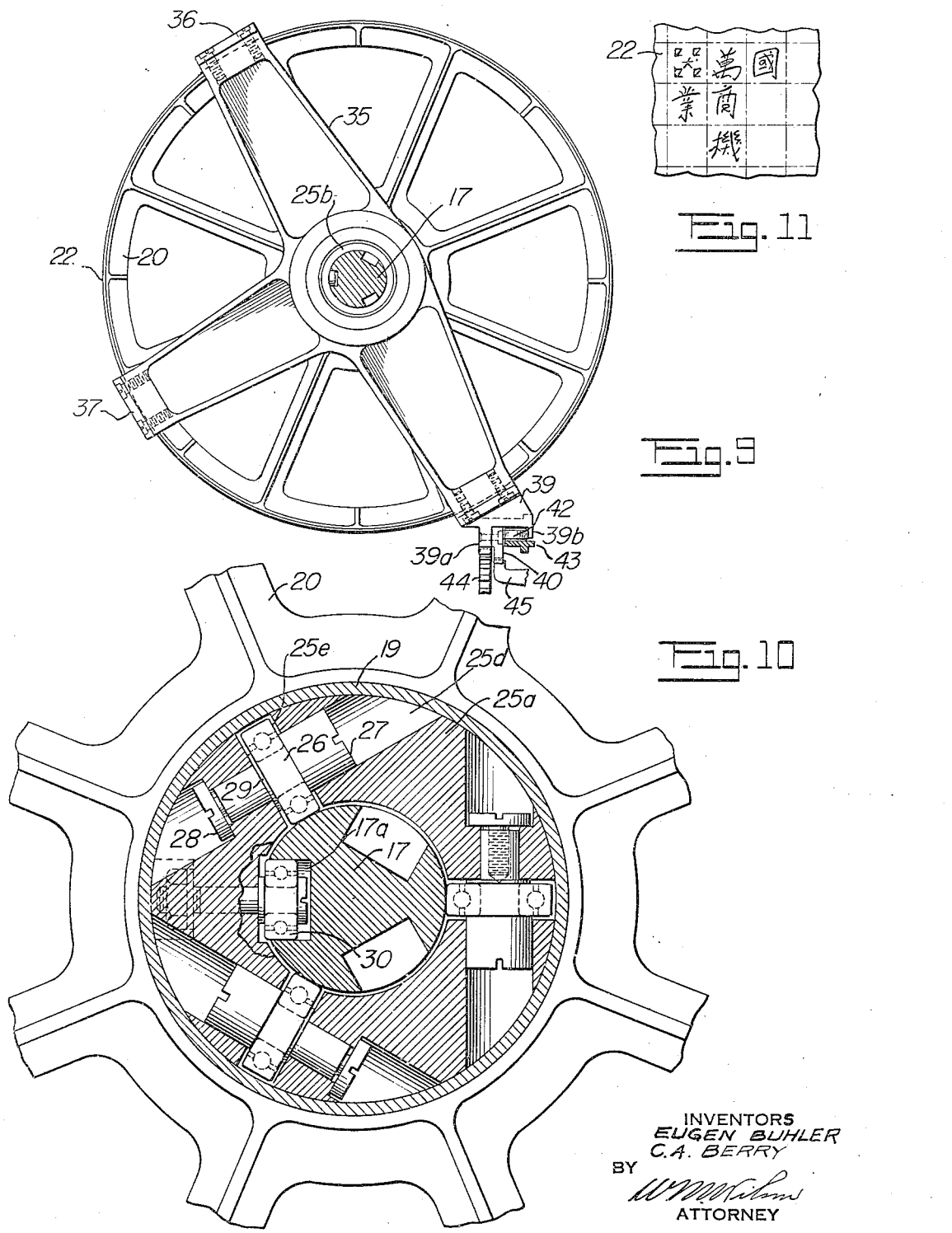

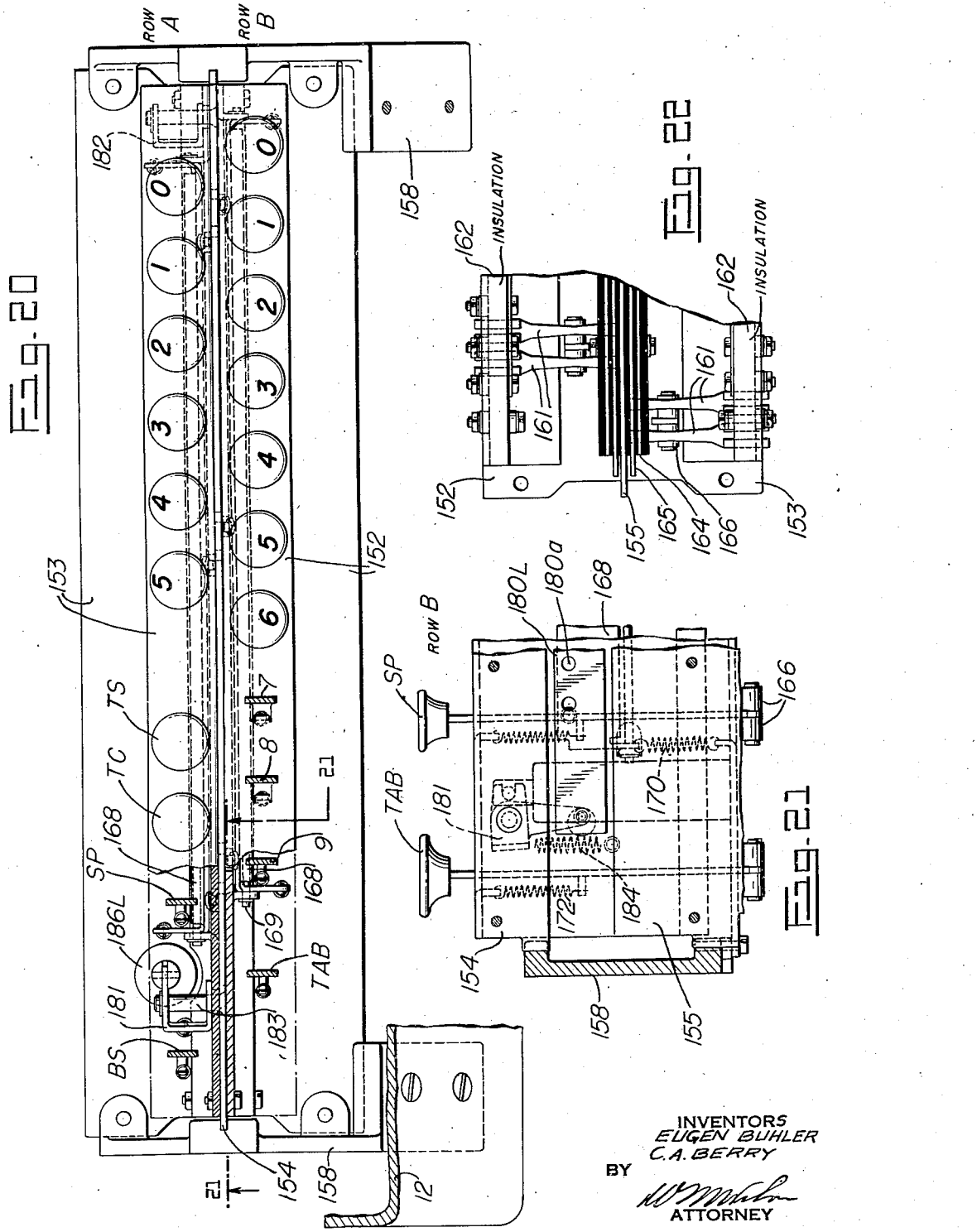

Jan. 4, 1949.  E. BUHLER ET AL  2,458,339
MACHINE ADAPTED FOR TYPING CHINESE IDEOGRAPHS
Filed May 3, 1946  20 Sheets-Sheet 10
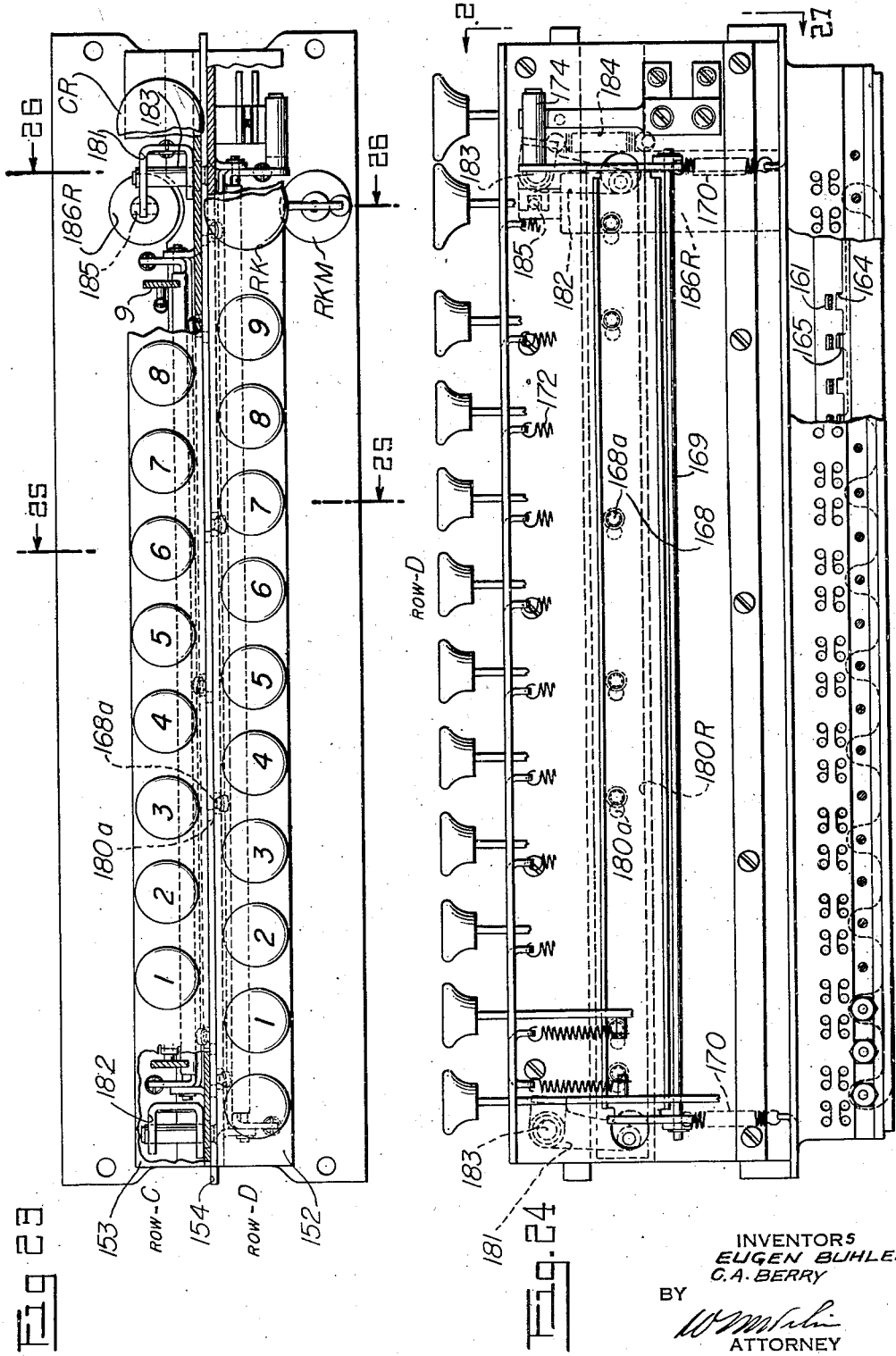
INVENTORS
EUGEN BUHLER
C. A. BERRY
BY
ATTORNEY

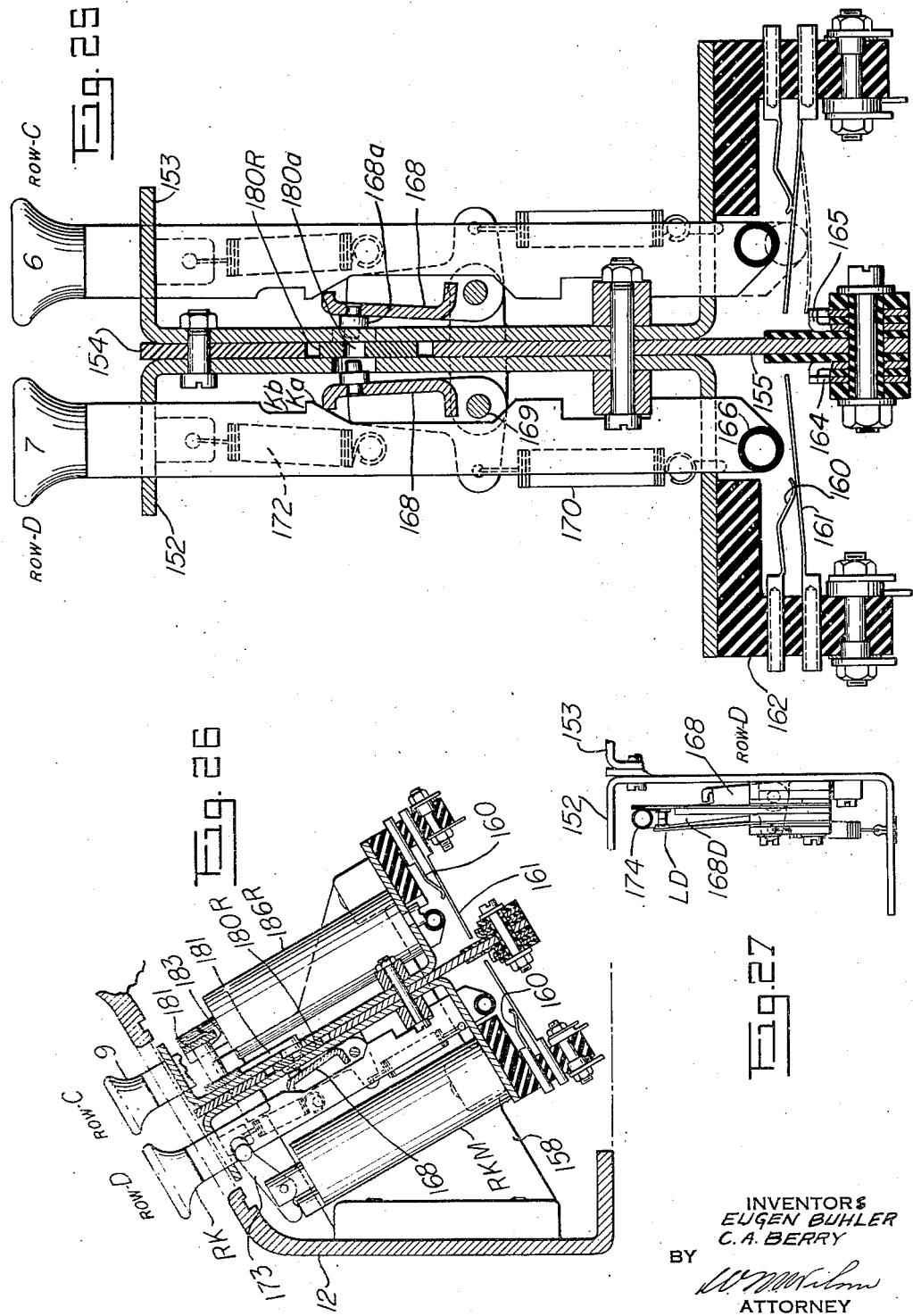

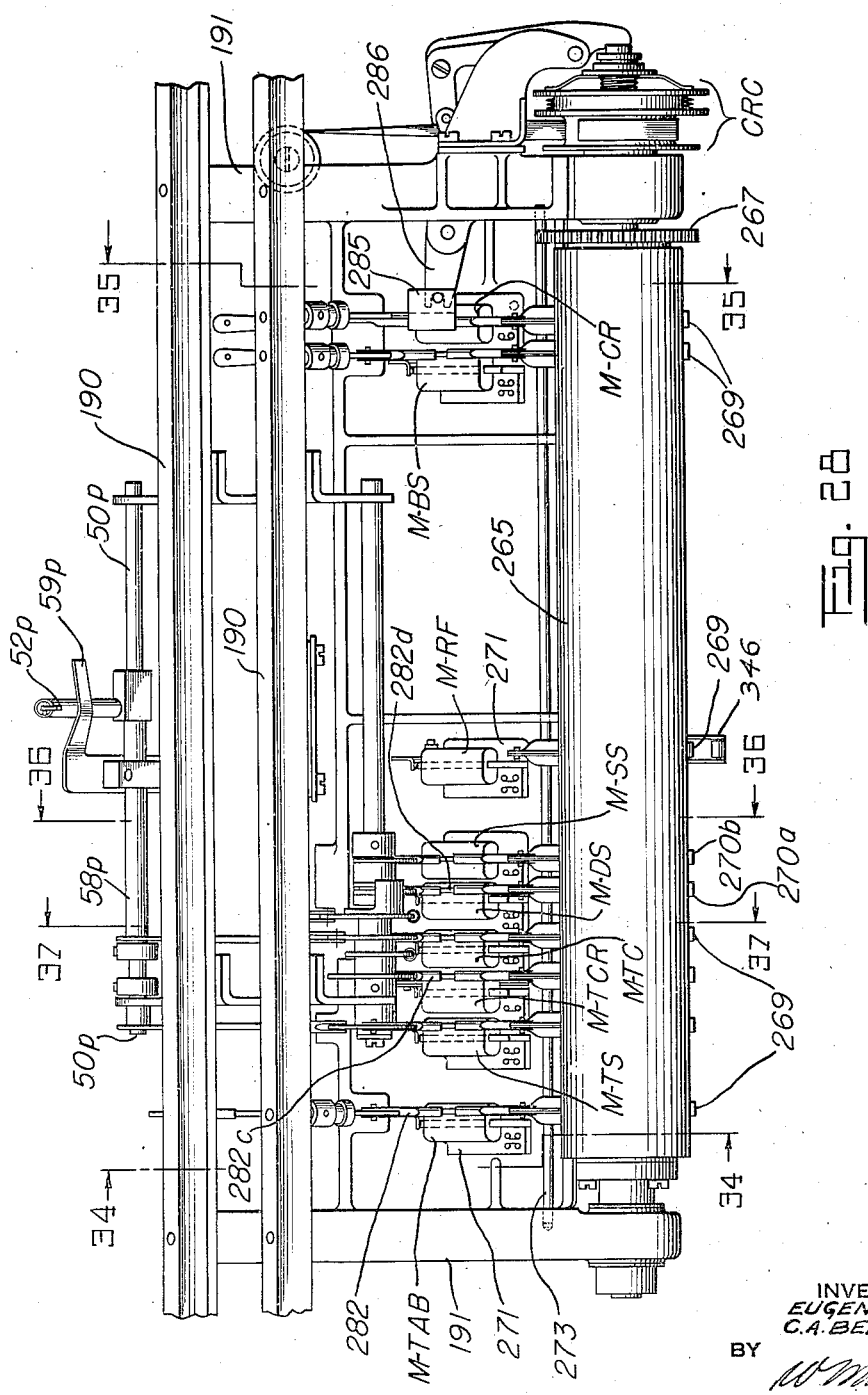

Jan. 4, 1949.  E. BUHLER ET AL  2,458,339
MACHINE ADAPTED FOR TYPING CHINESE IDEOGRAPHS
Filed May 3, 1946  20 Sheets-Sheet 13
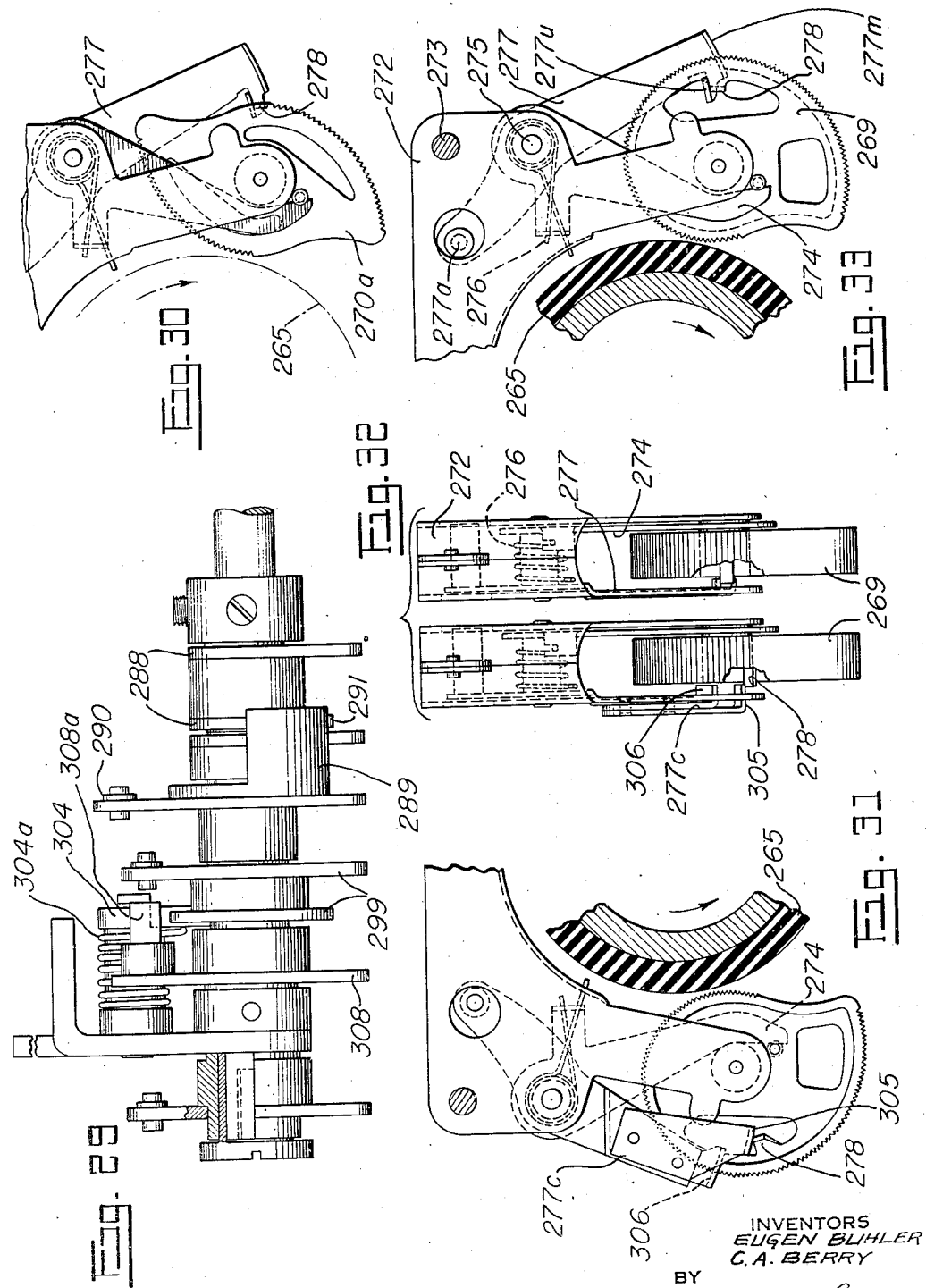
INVENTORS
EUGEN BUHLER
C. A. BERRY
BY
ATTORNEY

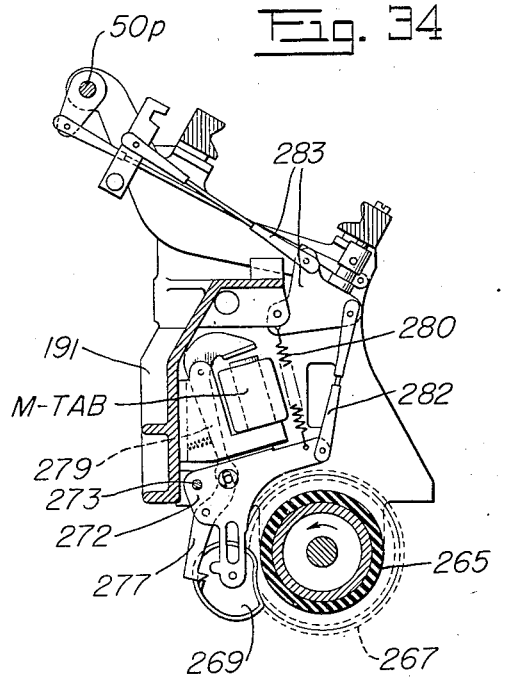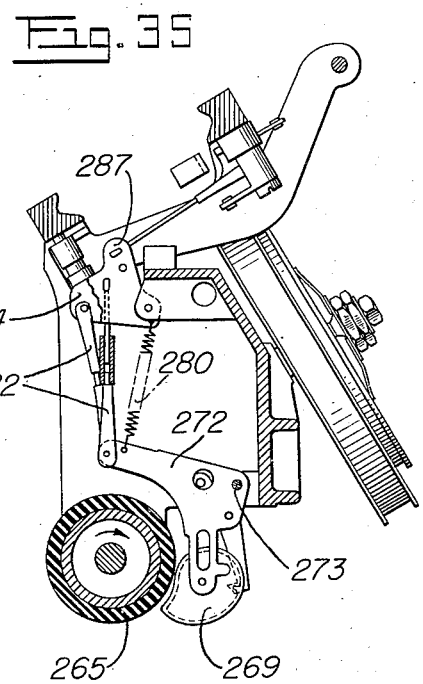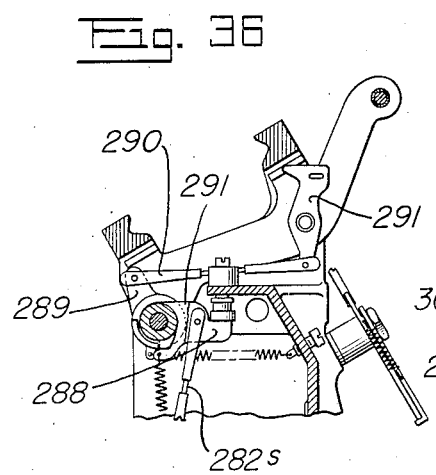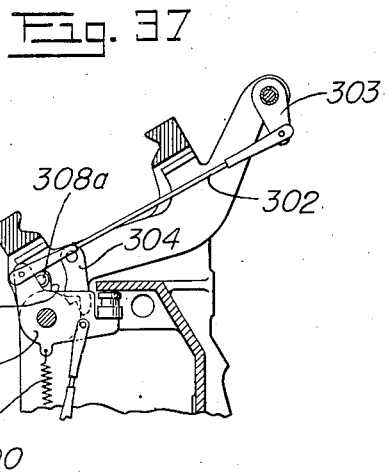

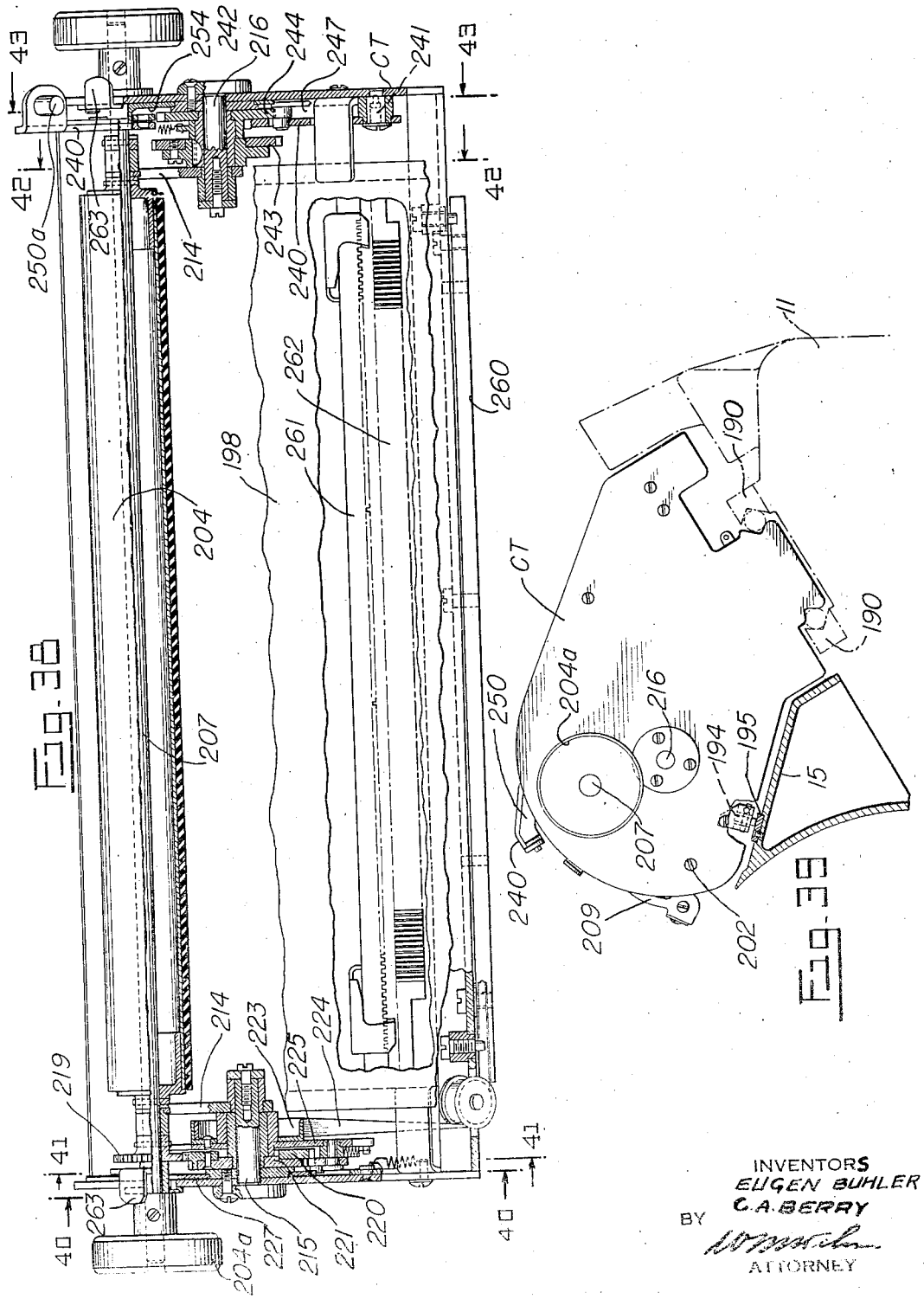

Jan. 4, 1949.  E. BUHLER ET AL  2,458,339
MACHINE ADAPTED FOR TYPING CHINESE IDEOGRAPHS
Filed May 3, 1946  20 Sheets-Sheet 16
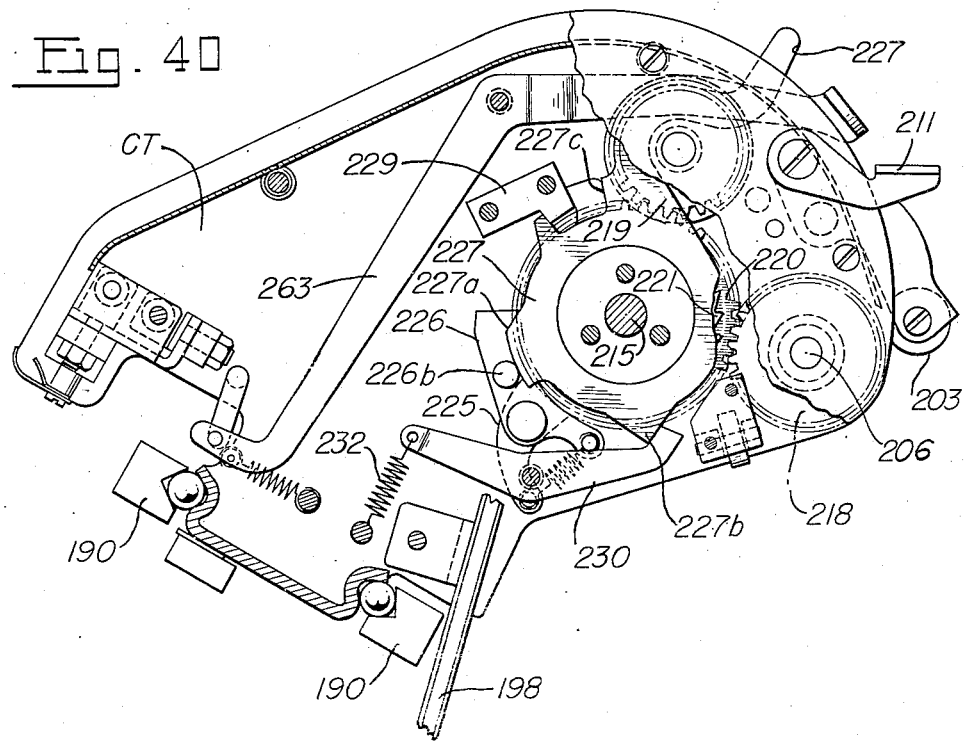
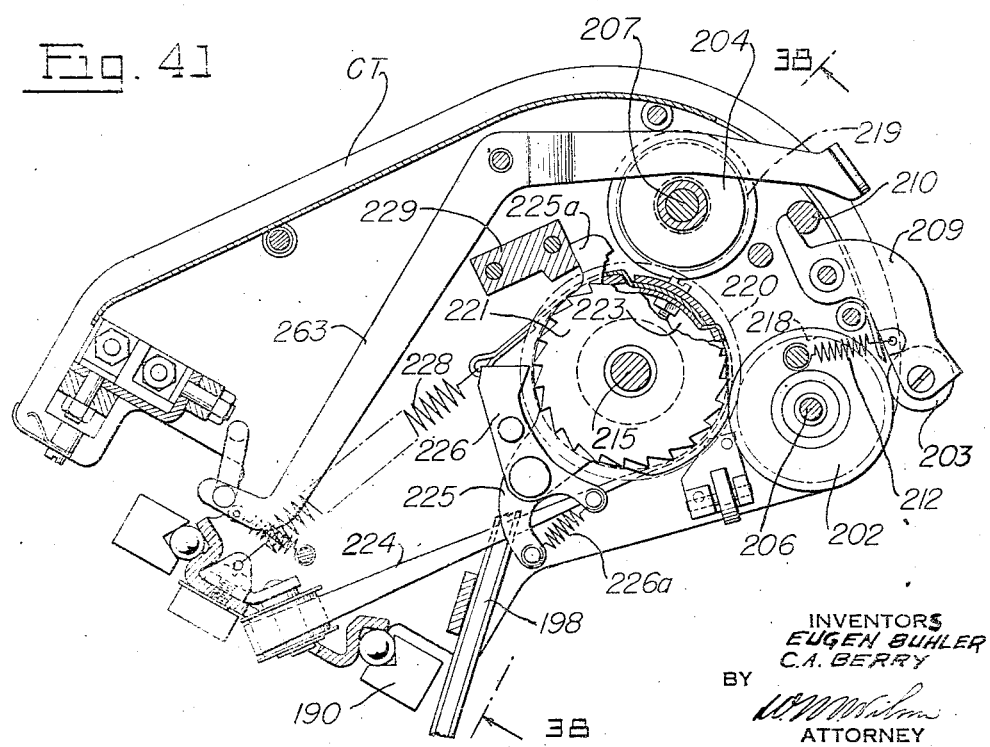
INVENTORS
EUGEN BUHLER
C.A. BERRY
BY
ATTORNEY

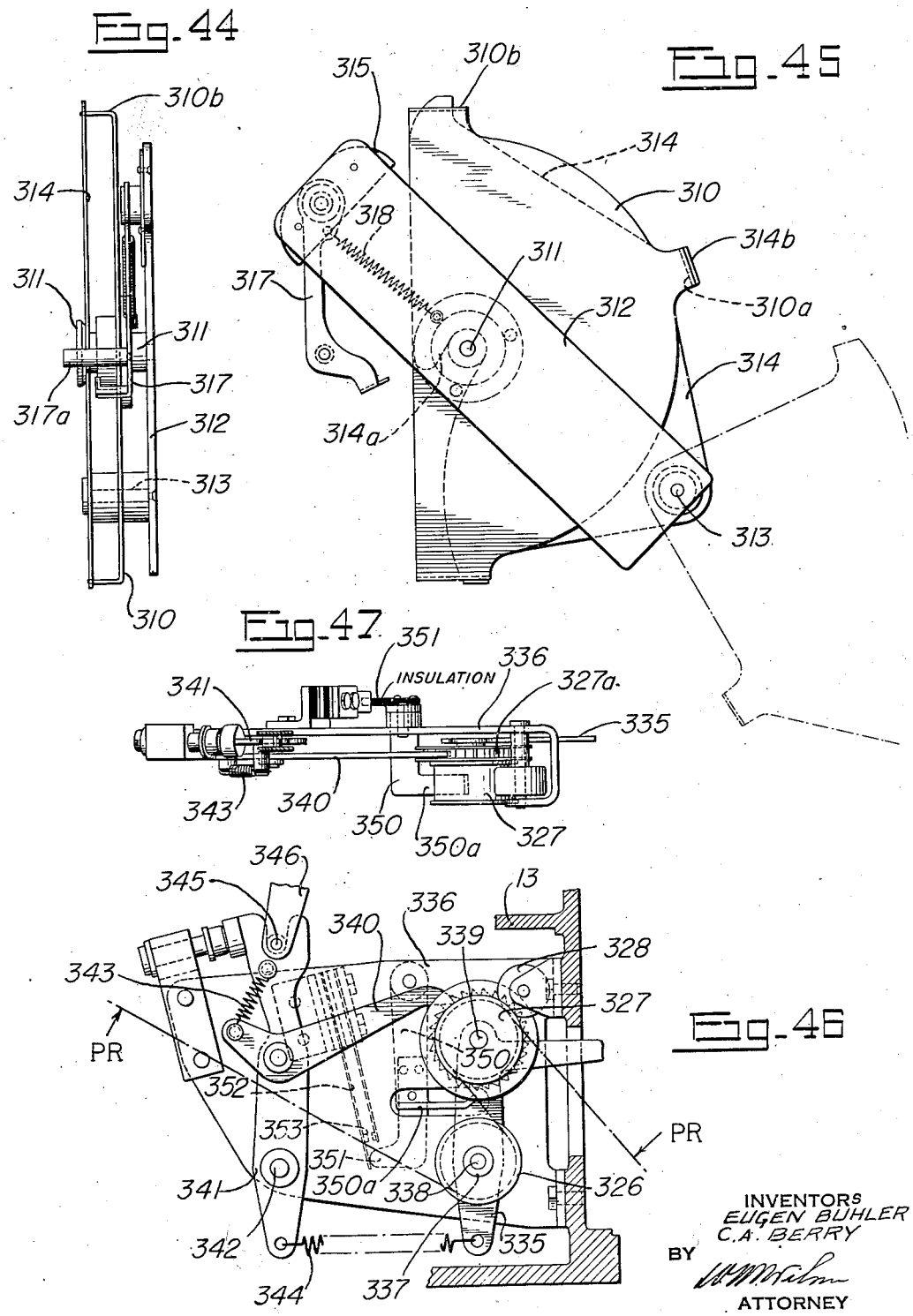

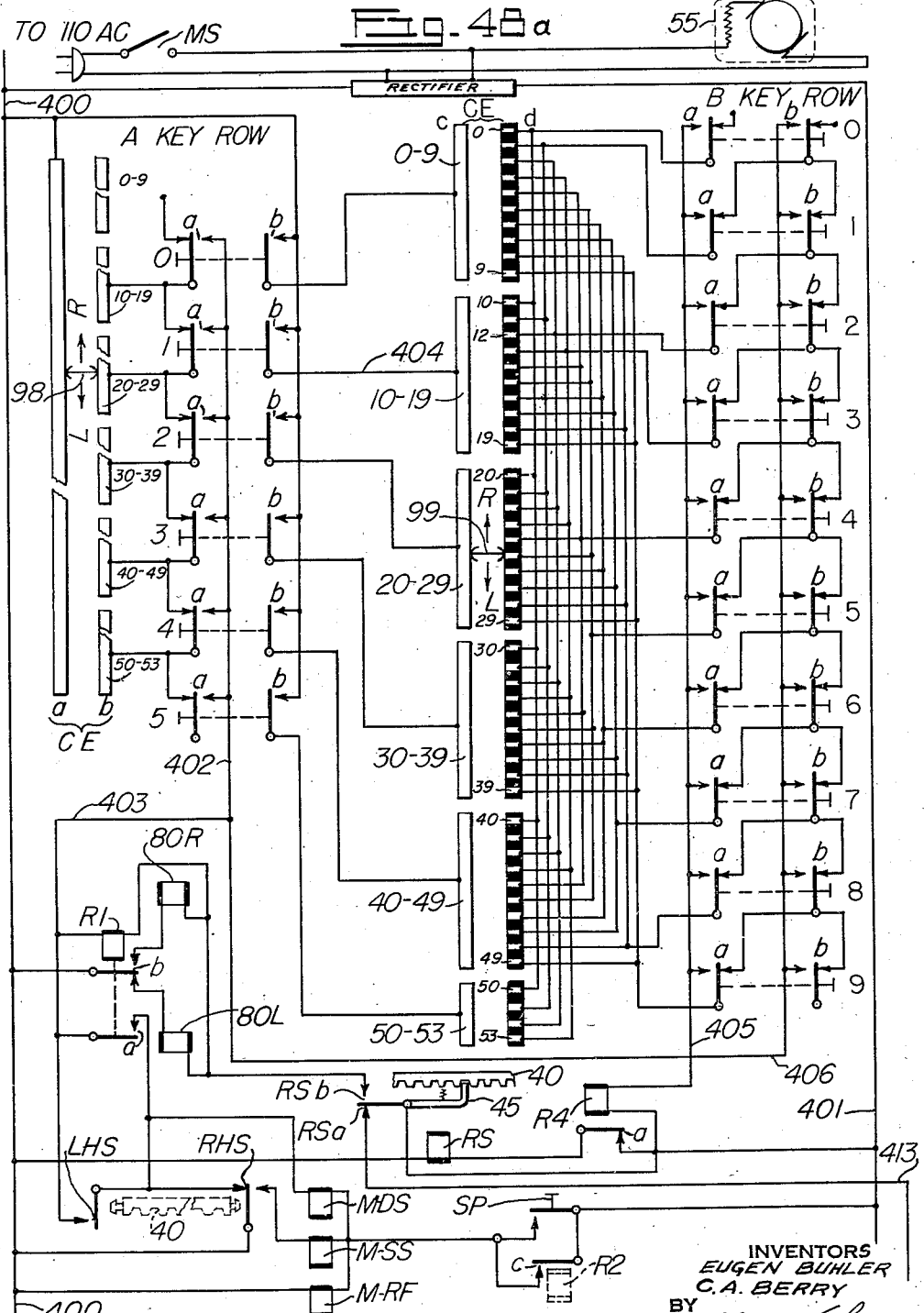

Jan. 4, 1949.  E. BUHLER ET AL  2,458,339
MACHINE ADAPTED FOR TYPING CHINESE IDEOGRAPHS
Filed May 3, 1946  20 Sheets-Sheet 20

INVENTORS
EUGEN BUHLER
C.A. BERRY
BY
ATTORNEY

Patented Jan. 4, 1949

2,458,339

UNITED STATES PATENT OFFICE 2,458,339

MACHINE ADAPTED FOR TYPING CHINESE IDEOGRAPHS

Eugen Buhler and Christopher A. Berry, Poughkeepsie, N. Y., assignors to International Business Machines Corporation, New York, N. Y., a corporation of New York Application May 3, 1946, Serial No. 666,980

29 Claims. (Cl. 197—1)

This invention relates to a machine for typing Chinese ideographs and its general object is to provide improvements over the machine disclosed in an application of Chung-chin Kao, Serial No. 542,492, issued as Patent No. 2,412,777, on December 17, 1946.

It would be impractical to use an ordinary form of typewriter construction for typing Chinese ideographs because the number of such ideographs is too great, in excess of five thousand. In accordance with the system disclosed in the above mentioned application, each ideograph is given a combinational codal identification and may be selected for typing in response to its identification. A great number of different codal combinations may be had with a small number of code elements. This fact makes it possible to provide a machine with a small number of selectors which are operable in many combinations to call the corresponding characters for typing. It is convenient and practical to use decimal place numbers as the character identifications. For a number of characters less than ten thousand, four place call numbers are sufficient.

The present machine has a capacity of fifty-four hundred characters and may be considered as actually provided with that many. Included are some 5300 Chinese ideographs, the English capital leters and punctuation symbols, the Arabic numerals, a few fractions, and the Chinese phonetic symbols. Any one of these characters may be selected in response to its call number representation. Such representation is afforded here by a keyboard which is preferably provided with denominational order sets of numeral keys, one order for each place of the call numbers. Since there are fifty-four hundred characters to be considered here, they may be identified by call numbers 0000 to 5399, respectively. Thus, the number of places in the call numbers is four and, therefore, four orders of numeral or selection keys are provided. To call a character for typing, a combination of four numeral or selection keys is operated, each operated key being in a different one of the four orders and representing the digit in the corresponding decimal place of the character identifying number.

The type counterparts of the characters are formed in relief on a type cylinder, preferably by an etching process. The types are arranged in fifty-four circular columns, each with one hundred types. The characters are printed one at a time and for this purpose a common, single character printing position is needed. To bring a desired one of the fifty-four hundred types into cooperation with the printing means at the printing position, it is required to effect a column selection and an intra-column selection of the types. The column selection involves the axial shift of the type cylinder while the intra-column selection involves the rotation of the cylinder.

The present invention has for its object the provision of an improved, efficient, and rapidly functioning machine for typing Chinese ideographs, as well as other characters, selected for typing in accordance with the system outlined above.

It is also an object of the invention to provide for automatic rapid selection of any one, out of a great many of available types, for the making of an imprint.

More specifically, it is an object of the invention to provide for rapid selection of any of the types, out of fifty-four columns of one hundred types, on a type cylinder by first effecting automatic, rapid selection of the column containing the type and then a rapid automatic, intra-column selection of the particular type.

It is an object of the invention to select one out of a number of columns of elements for cooperation with operating means by automatically moving the desired column and operating means relative to each other in the nearest of two possible, relatively opposite directions.

More specifically, an object of the invention is to select one of a number of columns of a cylinder or the like by automatically moving the cylinder or the like transversely in the nearest direction in which the desired column will reach an operating location.

Still more specifically, an object of the invention is to select one of a number of columns of types on a type cylinder by automatically moving the cylinder axially in the nearest direction in which the desired column will reach a printing plane.

Another object of the invention is to effect the intra-column selection of a type by operating printing means automatically when the desired type has been rotated to the printing position.

More specifically, an object of the invention is to provide a plurality of columns of types on a cylinder which is maintained in continuous rotation and yet adjustable axially without interruption of its rotation.

An object of the invention is to effect printing on the fly at a common printing position for a plurality of types arranged in columns of a rotating cylinder.

According to the invention, each column of types or the like has elements with a common decimal place digit designation. In the present case, such column designations range from 53 to 00. A column selection is made by setting up the keyboard with the column designation. Specifically, the number of the column is set up by depressing the proper number keys in the thousands and hundreds orders of the key sets. The types in each column are differentiated by call numbers whose two right hand digits range between 00 and 99. To select a type out of a column, the two right hand digits of the type call number are set up by depressing the proper number keys in the tens and units orders of the key sets. The effect of the keyboard selection of the two left hand digits of a call number is to select a column by locating and detaining it at the printing plane. The effect of setting up the two right hand digits on the keyboard is to time the printing means with respect to a rotational cycle of the drum so as to strike the desired type.

It is also an object of the invention to provide means for automatically bringing the printing means into operation as a result of the selection of the final digit of a call number; that is, when the selected call number has been completely set up on the keyboard.

Another object is to provide for automatic normalizing of the final digit selecting order set of keys after each selection and printing of a character.

Another object is to provide means for preventing repeat printing for a single selection of a character.

Another object is to prevent printing until axial movement of the type cylinder has definitely been arrested.

It is also an object to attain the foregoing purposes, severally, through electric circuit means.

Another object is to provide shock-absorbing arresting means for arresting transverse adjustment of an element such as the type cylinder.

Other objects of the invention will be pointed out in the following description and claims and illustratated in the accompanying drawings, which disclose, by way of examples, the principle of the invention and the best mode, which has been contemplated, of applying that principle.

In the drawings:

Fig. 1 is a perspective view of the machine.

Fig. 2 is a section taken substantially along lines 2—2 of Fig. 1.

Fig. 3 is a plan view of the framework of the machine.

Fig. 4 is a right hand end view showing the drive gearing for certain parts of the machine.

Fig. 5 is a detail section showing the printing means.

Fig. 6 is a section taken along lines 6—6 of Fig. 4

Fig. 7 is a front, partly sectioned view of the type drum and associated cradle.

Fig. 8 is a section through the type drum and end castings.

Fig. 9 is a view taken along lines 9—9 of Fig. 7.

Fig. 10 is a section along lines 10—10 of Fig. 8.

Fig. 11 is an enlarged view of a few character types on the surface of the type cylinder.

Fig. 12 is a view, partly in section, through one of the clutch drive means for the drum and also through the drum arresting means.

Fig. 13 is a plan view of the drum arresting latch and associated parts.

Fig. 14 is a front view of one of the emitters and its drive gearing.

Fig. 15 is a section along lines 15—15 of Fig. 14.

Fig. 16 is a front view of the means for slidably mounting the drum latch and its operating solenoid.

Fig. 17 is an enlarged sectional view taken along lines 17—17 of Fig. 16.

Fig. 18 is a plan view of the portion of the machine showing the drive means.

Fig. 19 is a section along lines 19—19 of Fig. 18.

Fig. 20 is a partly sectioned plan view of the left hand keyboard unit.

Fig. 21 is a section along lines 21—21 of Fig. 20.

Fig. 22 is a bottom view of a fragment of a keyboard unit.

Fig. 23 is a partly sectioned plan view of the right hand keyboard unit.

Fig. 24 is a front view of the right hand keyboard unit.

Fig. 25 is an enlarged section taken along lines 25—25 of Fig. 23.

Fig. 26 is a section along lines 26—26 of Fig. 23.

Fig. 27 is an end view along lines 27—27 of Fig. 24.

Fig. 28 is a front view of the power roller and the cam units operated thereby for effecting certain functions of the machine.

Fig. 29 is an enlarged detail view of a portion of Fig. 28.

Fig. 30 is a detail view of the double character spacing cam unit.

Fig. 31 is a detail view of the tab clear release cam unit.

Fig. 32 is a front view of the latter cam unit and the adjacent tab clear cam unit.

Fig. 33 is a detail of the cam unit such as used for each of several functions.

Fig. 34 is a section along lines 34—34 of Fig. 28.

Fig. 35 is a section along lines 35—35 of Fig. 28.

Fig. 36 is a section along lines 36—36 of Fig. 28.

Fig. 37 is a section along lines 37—37 of Fig. 28.

Fig. 38 is a section generally along lines 38—38 of Fig. 41.

Fig. 39 is an end view of the carriage in an intermediate position.

Fig. 40 is a section along lines 40—40 of Fig. 38.

Fig. 41 is a section along lines 41—41 of Fig. 38.

Fig. 44 is an end view of the holder for the ink ribbon supply roll.

Fig. 45 is a side view of this holder also showing in phantom the open position of a hinged cover of the holder.

Fig. 46 is a side view of the ink ribbon feed means.

Fig. 47 is a top view of this feed means.

Figure 48B:
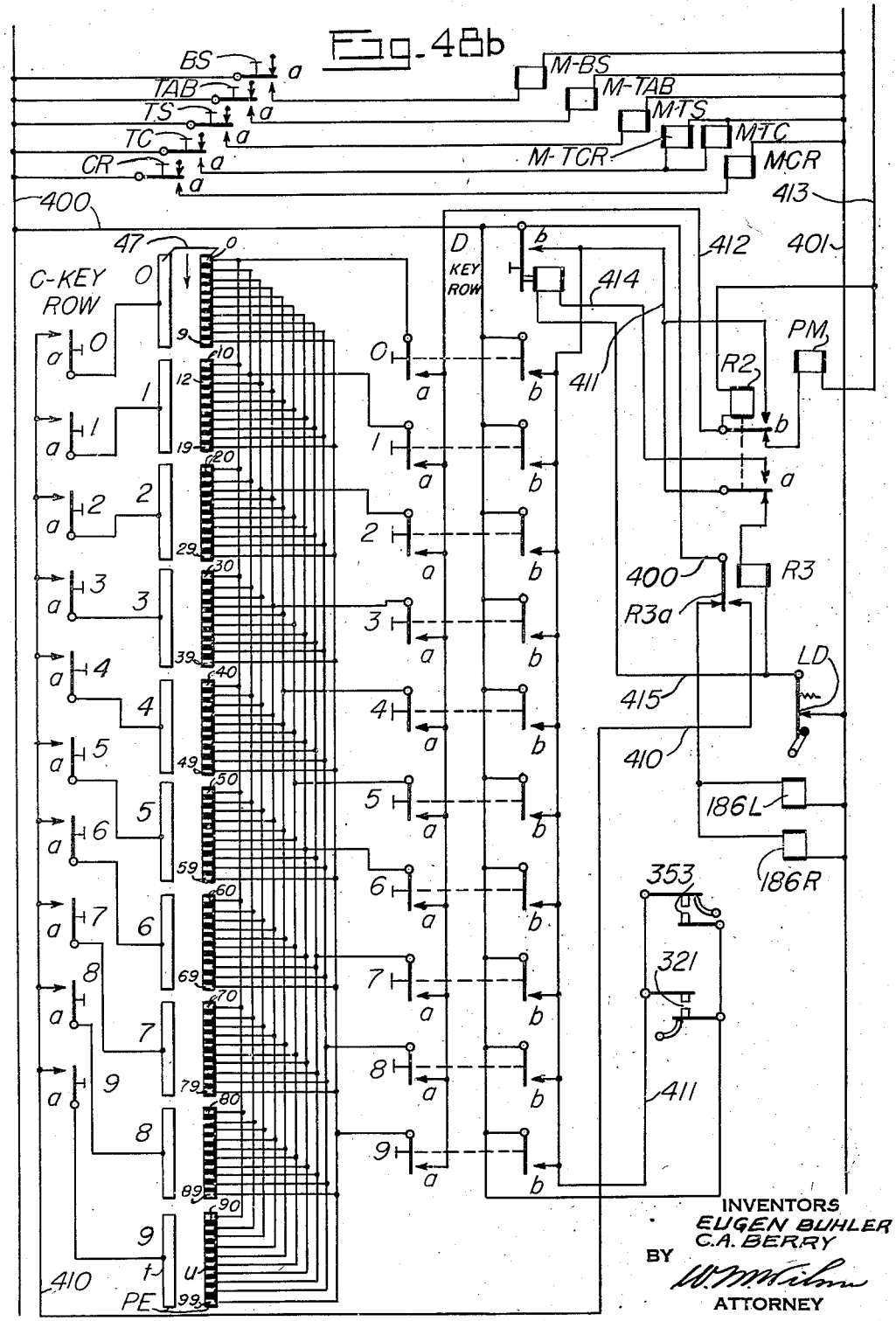

Figs. 48a and 48b constitute the circuit diagram.

*The type drum and related mechanism*

The machine has a built-up frame including end castings 10 and 11 (Fig. 3) bridged by front and rear castings 12 and 13 and intermediate cross beams 14 and 15. Other frame elements are mentioned as the description proceeds.

The end castings 10 and 11 (also see Figs. 4 and 8) carry ball bearings 16 journaling a continuously rotated shaft 17. Keyed to shaft 17, by means described presently, is a type drum (also see Figs. 7, 9, and 10). The hub of the drum comprises a tube 19, of light-weight material such as magnesium, to which circular spiders 20 of similar material are fastened. The type cylinder, mentioned earlier, is designated 22 and also is of light-weight material. The type cylinder is supported by the spiders 20 and attached by screws 23 to the end spiders. As previously stated, the type cylinder has fifty-four circumferential columns of types, each column containing one hundred types. The selection of a type involves the adjustment of the type drum transversely to bring the column including the desired type into the printing plane and then the timing of impression-taking means to strike the desired type as it passes the printing position during continuous rotation of the drum. It is preferred that the type drum be adjustable transversely without interrupting its continuous rotation. Accordingly, the drum is so mounted on shaft 17 that it can be adjusted transversely while remaining in continuous rotation. The means so mounting the drum are described below.

The hub of the type drum includes, besides the tube 19, two end pieces of light-weight material, attached to the tube. Each end piece is formed with a section 25a (Figs. 7 and 10) fitting into an open end of tube 19, a collar section 25b adapted to extend outside the tube, and a flange 25c between sections 25a and 25b for limiting insertion of the section 25a into the tube and thereby locating the end piece axially with respect to the tube. Each end piece internally carries three ball bearing rollers 26 to engage three equidistant points of the circumference of shaft 17. For this purpose, the end piece has three chordal bores 25d bisected by radially extending slots 25e, as best indicated in Fig. 10. The slots 25e accommodate the ball bearing rollers 26 and washers 29 while bores 25d receive studs 27 and coacting screws 28 for mounting the rollers. The rollers 26, three in each end piece, centralize the type drum 18 on shaft 26 and also afford anti-friction traction for the drum upon its adjustment lengthwise of the shaft. Each end piece also mounts an additional ball bearing roller 30 in position to ride inside a keyway 17a in shaft 17. The two rollers 30 (also see Fig. 8), one in each end piece, key the drum to the shaft for rotation and afford further anti-friction traction for the drum upon its adjustment along the shaft. The tube 19 and the attached end pieces surround shaft 17 with clearance. Hence, the type drum 18 engages the shaft only through the centralizing ball bearing rollers 26 and the keying ball bearing rollers 30, so that traction of the drum along the shaft may take place with a minimum of friction. This feature, added to the fact that the type drum is extremely light in weight, because its parts are made of light-weight material, provides for a minimum of inertia and momentum of the drum upon its transverse adjustment.

Adjustment of the drum along the shaft 17 is effected by adjusting a cradle 35 (Figs. 2, 7, 8 and 9) which straddles the drum. The cradle comprises three-armed sides and tie bars 36, 37, and 39 joining the arms of the two sides. The cradle is mounted through needle bearings on the collar sections 25b of the end pieces of the drum hub and its sides abut the flanges 25c. The mounting permits the drum to rotate freely inside the cradle and at the same time compels the drum, upon movement of the cradle lengthwise of the shaft 17, to move with the cradle. The tie bar 39 of the cradle is formed with a rack 39a and a ledge 39b, both parallel to shaft 17. A second, parallel rack 40 is fixed to a side of rack 39a and spaced from ledge 39b, whereby the rack 40 and the ledge define a channel running parallel to shaft 17. Extending into the channel is a roller 42 (Figs. 2, 9, 12, and 18) carried by a plate 43 fixed to the intermediate casting 14.

Roller 42 prevents rotation of the cradle, restricting it to linear movement parallel to shaft 17. Such linear movement is effected at the proper time by the turning of a gear 44 which is in mesh with rack 39a (also see Fig. 7). The transverse movement of the cradle effects similar movement of the type drums. Arrest of the cradle movement also arrests transverse shift of the type drum. The arresting means, which will be described later in detail, includes a latch 45. The nose of the latch is engageable with rack 40. The spacing of the rack teeth is the same as the spacing of the type columns. Hence, when the cradle 35 comes to rest with the latch 45 in engagement with a tooth of rack 40, a type column is alined with the printing position.

As explained previously, the selection of a type involves the timing of impression-taking means to strike the desired type during its arc of travel across the printing position. The means providing this timing includes an emitter generally designated PE in the circuit diagram (Fig. 48b). Referring to Fig. 8, the stator of the emitter is fastened to the end casting 10 and has three rings of contact segments concentric to shaft 17. The segments of the right hand ring are the tens segments and generally designated $t$ and those in the two other rings are the units segments and generally designated $u$. The three rings of segments are wiped, respectively, by three brushes 47 fixed in a brush holder 48 (also see Fig. 2) of conductive material. The brush holder is rigidly mounted on the free end of an arm 49 of insulating material, fixed to shaft 17. Since the brush holder 48 is of conductive material, it electrically connects the three brushes 47 which are, therefore, collectively equivalent to a single brush structure which may be referred to as wiper 47. There are fifty equidistant contact segments $u$ in each of the two left hand rings, those in one of the rings being staggered in circumferential position midway of those in the other ring. As both rings are wiped by conductively connected brushes, they are, together, electrically equivalent to a single ring with one hundred equidistant contact segments $u$, the circumferential spacing of which corresponds to circumferential spacing of the hundred transverse lines of types provided on type cylinder 22. During rotation of shaft 17, the brush structure wipes each segment $u$ coincidentally with the travel of a corresponding transverse line of types, of the cylinder 22, across a reference line, at one point of which is located the printing position. Regarding the right hand ring of the emitter, it has ten equidistant segments $t$, each of which will be wiped by the brush structure during the time that a series of ten successive transverse lines of type travels across the reference line. The circuits through the emitter will be traced later.

Drive for the type drum and other parts of the machine is derived from an electric motor 55 (Figs 2 and 18). A coupling 57 connects the motor shaft to a shaft 58 extending into and journaled in a gear box 60a which is attached to a shaft and gear case 60 secured to the intermediate beam 14. Inside gear box 60a is a worm 61 (see Fig. 19) fixed to shaft 58 and meshed with a worm wheel 62 on a shaft 63. Shaft 63 is connected by a coupling 64 to a shaft 65 which at the right hand end carries a gear 66. As shown in Fig. 4, gear 66 drives an intermediate gear 67 which, in turn, drives a gear 68 (also see Fig. 8) secured to shaft 17. Through the described gearing, motor 55 rotates shaft 17 and, thereby, the type drum continuously.

Shaft 63 (Figs. 18 and 19), which is an element of the drive means for the type drum, also serves as an element of the means for shifting cradle 35 and, thereby, the type drum along the shaft. Shifting of the cradle may be to the left or to the right and varies in extent in accordance with the transverse distance between the desired type column and the printing position. The means for shifting the cradle includes a bevel gear 70 fixed to the left end of shaft 63. Gear 70 meshes with a gear 71 to drive a shaft 72. Shaft 72 is journaled in housing 60 and its rear end extends past the back of the housing. Two other shafts 73 and 74 are similarly supported in housing 60. Pinned to the rear end of shaft 72 is a gear 75 meshed with a gear 76 fixed to the rear end of shaft 73. As long as motor 55 is in operation, gears 75 and 76 are continuously rotated in clockwise and anti-clockwise directions, respectively (as viewed in Fig. 19). Gears 75 and 76 serve as driving elements for selectively engaged clutches. Fig. 12 shows the clutch associated with gear 76 in detail and a completely similar clutch is associated with the gear 75. Referring to Fig. 12, a friction disk 77 is located on shaft 73, between the gear 76 and a disk 78a which is integral with a gear 78. The hub 78b of gear 78 is journaled by needle bearings on the rear end of shaft 73. In line with shaft 73 is the plunger 79 of a solenoid 80R mounted on the intermediate beam 14. A thrust and ball bearing 72 is located between a shoulder of the plunger 79 and a plate 83 which is fixed into the right end of hub 78b of gear 78. When solenoid 80R is not energized, plunger 79 exerts no pressure on the hub 78a; and gear 76 does not drive gear 78. Upon energization of the solenoid, it moves the plunger to the left (Fig. 12) to exert pressure against the hub 78b. This pressure is transmitted to the friction disk 77 and, in consequence, gear 76 drives the gear 78. Gear 78 meshes with gear 44 pinned to the rear end of shaft 74. As previously mentioned, gear 44 meshes with rack 39a of cradle 35. The gear 78, when clutched in, rotates counterclockwise, and drives gear 44 clockwise. Gear 44, in turn, acts upon rack 39a to shift the cradle and drum towards the right (as viewed in Fig. 7).

Similar clutching means, engaged upon energization of a clutch magnet 80L (Fig. 18), are provided between the gear 75 and a gear 86 (also see Fig. 19). Gear 86 also is in mesh with gear 44. Since gear 75 rotates clockwise, the gear 86 when clutched thereto drives the gear 44 counterclockwise. Gear 44, in turn, drives rack 39a to the left (Fig. 7), so that the cradle 35 and type drum are shifted transversely to the left. Thus, when gear 86 in clutched in the type drum is shifted to the left, but when gear 78 is clutched in, the type drum is shifted to the right. Circuits traced subsequently select either gear 78 or gear 86 to produce the transverse shift of the drum.

These circuits include an emitter, generally designated CE, shown in Figs. 14 and 15, and the electrical features of which are indicated in the circuit diagram (Fig. 48a). The brushes of the emitter are operated in unison with the transverse shift of the type drum. For this purpose, gear 44 when shifting the drum transvsersely drives a gear 90 (Figs. 18 and 19) on a shaft 91 which is journaled between intermediate beam 14 and rear casting 13 (also see Fig. 14). The rear end of shaft 91 has a gear 92 which drives a gear 93, the hub of which is journaled on a stud 94 (see Fig. 15) fixed into the rear casting. Attached to the face of gear 93 are insulating arms 95 and 96 carrying angle brackets 97 of conductive metal. Two wipers 98 and 99 are fixed to the two brackets, respectively. Each wiper is formed with two laterally spaced brush tips so curved at the ends as to effect wiping action with equal ease when turning clockwise or counterclockwise. The four brush tips are disposed side-by-side in a single line and engage four circular contact sections $a$, $b$, $c$, and $d$ of the cylindrical stator of the emitter. The stator is fixed into a hollow of the rear casting and includes insulation between the contact sections and the frame and also between the contact sections themselves. The electrical features of the contact sections will be clear from the circuit diagram (Fig. 48a). It may be mentioned here that sections $a$ and $b$ are bridged by wiper 98 while sections $c$ and $d$ are bridged by wiper 99. The circuits made through the emitter are traced later. It is sufficient now to state that they control the direction of transverse shift of the type drum and also control means to arrest the transverse shift of the drum when the selected type column reaches the printing plane. The arresting means includes the latch 45, previously mentioned, and its operating solenoid RS (Figs. 2, 12, and 13). Solenoid RS is in energized status while the transverse shift of the drum is taking place and, thereby, is keeping the latch 45 away from rack 40, as indicated in Fig. 12. To terminate the transverse shift, the solenoid is de-energized whereupon a spring 102 rocks the latch clockwise to bring the latch nose into a notch of rack 40, as shown in Fig. 2. As previously stated, this results in alining the selected type column with the printing position. The arrest of the cradle 35 and, thereby, of the transverse shift of the type drum is not instantaneously brought about by the engagement of the latch 45 with cradle rack 40. Instead, in order to avoid shock, the arrest is effected with the aid of yieldable snubbing means. The snubbing action takes place upon engagement of latch 45 with rack 40 and, therefore, the latch and solenoid RS must be capable of transverse movement in either direction under the impetus of the cradle 35. For this reason, the latch 45 and the solenoid RS are mounted to a slidable block 105 (Figs. 12, 13, 16, and 17). Specifically, the pivot 103 of the latch 45 is carried by integral ears 105a of the block 105, while the solenoid RS is carried by a bracket 104 which is attached by screws to the rear face of the block 105, as best shown in Fig. 13. Block 105 is located between the previously mentioned plate 43, fixed to intermediate casting 14, and a lower plate 107 also fixed to this casting. Plates 43 and 107 are formed with guide ribs which engage in upper and lower ways formed in the block 105. The block 105 is thereby guided for slidable movement in a direction parallel to the direction of movement of cradle 35. The upper guide rib is formed with two downwardly extending lugs 43b (see Fig. 16) adapted to engage vertical edges of block 105 to limit its slidable movement, in either direction from its true position, to about $\frac{1}{32}$ of an inch. The ends of block 105 abut resilient rubber elements 108 and 109 which are located between plates 43 and 107 and between walls of the casting 14 and of block 105. It may be noted from Fig. 16 that the ribs of plate 43 protrude into grooves of the rubber elements 109 to hold them firmly in place. The rubber elements yieldingly resist sliding of block 105 and aid in centering the block. Further snubbing and positive centering means for the block include two scissor arms 110 which are pivotally carried by a stud 112 mounted to casting 14. Above stud 112 is a flanged stud 113 mounted to casting 14 by a clamp plate 114. The stud 113 has an eccentric portion 113a (see Fig. 17) which is located between the scissor arms 110. A third stud 115 is carried by slide block 105 vertically above stud 113. A spring 116 connects the arms 110 and normally holds them snug against the studs 113 and 115, so as to center the slide block 105 and the parts, including latch 45, carried thereby. It may be noted that stud 113 may be turned, after plate 114 is loosened, to adjust its eccentric portion 113a so as to establish the true centering positions of the scissor arms 110.

The foregoing has described shock-absorbing arresting means for the transverse shift of the type drum in either direction. It is clear now that upon engagement of latch 45 with cradle rack 40, the transverse momentum of the cradle and the type drum may effect slight sidewise movement of the latch 45. Such overthrow of the cradle and drum is taken up by shock-absorbing means which centers the cradle and drum in the proper transverse position in which it is held by latch 45 with the selected type column alined with the printing position.

Connected to the vertical arm of latch 45 is a slidable rod 120 engaged with the central blade of transfer contacts RSa and RSb (see Figs. 2 and 12). In the withdrawn position of the latch, contacts RSa and RSb are respectively open and closed (see Fig. 12). In the engaged position of the latch, the conditions of the contacts are reversed (see Fig. 1). The functions of these contacts will be explained later in connection with the circuits.

Referring to Figs. 6 and 7, the opposite ends of cradle rack 40 carry screws 122L and 122R. The left hand screw 122L is adapted to close contacts LHS which are mounted to the end casting 10, when the cradle 35 reaches the limit of its left hand travel. In a manner explained later in connection with the circuit diagram, the closure of contacts LHS brings about reversal of the direction of travel of the cradle. The right hand screw 122R is engageable with the central blade of transfer contacts RHS which are mounted to end casting 11. The left side of contacts RHS are normally closed and the right side normally open. When the cradle reaches its right hand limit, the last left hand drum column, i. e., column 0 (Fig. 8), is in the printing plane and the screw 122R reverses the status of contacts RHS, that is, it opens the right side of these contacts and closes the left side. The opening of the left side of contacts RHS causes a reversal in the direction of travel of the carriage, unless drum column 0 has been selected. The closure of the right hand side of contacts RHS causes a change from Chinese character spacing to English character spacing of the work sheet. The Chinese character spacing is double the English character spacing. The drum column 0 bears the English characters and other characters which require only single character spacing. Contacts RHS are reversed as described above, when column 0 is in the printing plane. Reversal of contacts RHS results in single character spacing. The character spacing means will be described later.

The printing means

Printing from the selected type is done on the fly, as now understood. The printing means is located behind the drum and includes a hammer 130 (see Figs. 2 and 5). The hammer is provided with a rubber tip for striking a type. The printing position is within a vertical plane labeled PL in Fig. 3, this plane, which has been referred to as the printing plane, being centrally located between the opposite limits of transverse travel of the type drum, so that a minimum average transverse movement of the drum is required to bring a desired type column to the printing plane.

Hammer 130 is mounted on a pivot 131 which is carried by a bracket 132. The bracket is attached by screws 133 to the middle of the cross beam 15 and protrudes upwardly through a central opening in this beam (see Figs. 2, 3 and 5). Bracket 132 journals a shaft 134 to which is pinned a continuously rotated cam-toothed roller 135, provided with ten equidistant cam teeth 135a. Attached to the top of the bracket 132 is another bracket 137 which mounts a magnet PM. Armature 138 of the magnet serves as a hammer latch pivoted on bracket 137 and having its free end forked to provide an upper arm 138a and a lower arm 138b. A spring 139 normally holds the armature 138 in unattracted position (Fig. 2) in which the front of its upper arm abuts the back of a rearward extension 130a of the hammer and latches it against retraction by a spring 140. In this latched position of the hammer, its striking tip is 1/16 of an inch away from the type cylinder 22 and its tail 130b is 3/1000 of an inch out of the path of the teeth 135a of roller 135.

A printing operation is effected when magnet PM is energized by a circuit traced later. Upon energization of the magnet, it rocks its armature 138 upwardly to unlatch the hammer 130. Thereupon the spring 140 retracts the hammer, the arm 130a thereof moving into the armature fork until it engages the base of the fork. Such engagement defines the cocked position of the hammer, (as shown in Fig. 5). As the hammer is cocked, its tail 130b comes into the path of an approaching cam tooth 135a of the roller 135. The tooth, in riding past the tail of the hammer fires the hammer, driving its striking tip to within about 1/16 of an inch from the type cylinder. The momentum of the hammer carries it the rest of the way to strike the type traversing the printing position. During this final increment of travel of the hammer, the inclined portion of its extension 130a cams against the inclined end of arm 138b of the armature 138 to effect positive return of the armature to its normal position, the magnet PM having been deenergized meanwhile. After the hammer strikes the type, it is returned by spring 140 to its latched position (Fig. 2) in which the rear of the hammer extension 130a abuts the front of armature arm 138a. Rebound of the hammer from its latched position is dampened by a plate spring 141 with a downwardly curved tip which engages a top lug 130c of the hammer. Roller 135 is driven continuously in synchronism with the type drum 18. As previously explained, the drum is rotated continuously through gears 66, 67, and 68 from the shaft 65 (see Figs. 4 and 18). Gear 66 is rigid with a gear 143 which meshes with an idler 144. The idler drives a gear 145 on a shaft 146. Combined with the gear 145 is a gear 147 meshed with a gear 148 on a shaft 134a which is, in effect, an extension of shaft 134 of roller 135. The gear ratios are such that the roller 135 is driven 10:1 with respect to the type drum 18. Thus, roller 135 makes one-tenth of a revolution to one-hundredth of a revolution of the drum. Since the roller has ten cam teeth and the drum has a hundred types in each column, it is clear that a cam tooth will pass the tail of hammer 130 as a type in a drum column passes the printing position. Consequently, upon release of the hammer, it will be fired by a cam tooth in time to strike a selected type then passing printing position.

*The keyboard*

The keyboard, shown in full in Fig. 1, has four rows of character selecting keys and function keys. The rows designated A and B are at one side of a vertical central plane through the machine, while the rows designated C and D are at the opposite side of this plane. In short, the keyboard is split into two structural sections, one containing rows A and B and the other containing rows C and D. Referring to Figs. 20 to 27, each keyboard section includes a key mounting frame having two U-shaped angle bars 152 and 153 disposed with their vertical sides adjacent each other but spaced by center plates 154 and 155. The bars 152 and 153 and plates 154 and 155 are bolted together. The key mounting frame is mounted at the ends to a pair of brackets 158 which are secured to the front casting 12.

The character selecting keys, hereinafter simply called selection keys, are those which have numbers on the key tops. Selection of a character is brought about by operation of a combination of four selection keys representing the call number of the character. There are 5400 characters delineated by the 5400 types on type cylinder 22 (Fig. 8). To each character is assigned a call number and such numbers range from 0 to 5399. There are six selection keys 0 to 5 in row A to select any of digits 0 to 5 in the thousands order of the call numbers. There are ten keys 0 to 9 in row B to select any one of digits 0 to 9 in the hundreds order of the call numbers. Similarly, ten keys 0 to 9 are provided in each of rows C and D to select the tens and units order digits of the call numbers. For instance, to select call number 0001, keys 0—A, 0—B, 0—C, and 1—D are depressed; to select call number 3400, keys 3—A, 4—B, 0—C, and 0—D are depressed.

The keyboard includes six function keys to bring about common operations of a typewriter. There are four function keys in row A (Figs. 1 and 20); namely, the back space key BS, the character space key SP, the tab stop clear key TC, and the tab stop setting key TS. Row B (Figs. 1, 20, and 21) includes the key TAB operated to produce a tab space operation. Row C (Figs. 1 and 23) includes the carriage return key CR.

A release key RK (Figs. 1, 23, and 26) is provided in row D for a purpose explained later.

The selection, function, and release keys operate key contacts. The key contacts include two pairs of normally engaged spring contact blades 160 and 161 below each key (see Figs. 22, 25, and 26). These blades are mounted in insulating bars 162 attached to the bottom of the key mounting frame. The lower center plate 155 carries, through insulation, common contact bars 164 and 165 which are insulated from one another. The common contact bars are of comb construction and the teeth of the bar 164 are opposite the notches in the bar 165. Each key is provided at its lower end with insulating sleeves 166. Upon depression of the key, its sleeves 166 engage a pair of blades 161 to separate them from their coacting blades 160 and bring one blade 161 into engagement with a tooth on common contact bar 164 and the other blade into engagement with a tooth on common contact bar 165. As will be clear from the circuit diagrams (Figs. 48a and 48b), not all of the contact blades 160 and 161 are connected into circuit, some of them not being needed in connection with the disclosed functions. For example, only one contact blade 161 of each of the selection keys in row C is connected into circuit. The key contacts will be differentiated in the circuit diagram and circuit description by the key designations and appended letters *a* and *b*.

Means are provided to latch down any selection key which is depressed, but the function keys and release key RK are not latched down when depressed. The selection key latching means includes a common latch bail 168 for the selection keys of the same row. The bail is rockably mounted on a round rod 169 which is carried by the key mounting frame. Springs 170 connected to the ends of the latch bail urge the bail into locking position. Each of the selection keys is formed with a cam lug $Ka$ and a notch $Kb$ directly above the cam lug. Upon depression of a selection key, against resistance of its lifting spring 172, its cam lug $Ka$ rocks the latch bail 168 out of the way until the notch $Kb$ reaches the bent-in upper edge of the bail. Thereupon, springs 170 rock the bail towards the key stem to seat the bent upper edge of the bail on top of the cam lug, thus latching the key down. Release of the selection key is effected upon depression of another selection key in the same row. In row D, a selection key may also be released by depression of the release key RK. As shown in Fig. 26, the stem of the release key has an inclined edge for camming the latch bail aside to release it from a previously depressed selection key in row D. The stem of the release key is not formed with a notch above its camming edge and, therefore, the release key itself is not latched down. The release key is coupled by a lever 173 to the plunger of a selenoid RKM. In a manner explained later in the circuit description, the solenoid is energized at completion of each printing operation to release the D row selection keys. The release key is also manually operable at will.

The stems of the function keys TS, TC, and SP (Fig. 20) are cut away in a manner requiring no illustration so as to by-pass the latch bails. The other function keys BS and TAB (Fig. 20) and CR (Fig. 23) are remote from the latch bails. Hence, a function key will not be latched down when depressed.

The latch bail 168 of row D only is provided at one side with an extension arm 168D which carries a pin 174 (Figs. 24 and 27) between the blades of contacts LD. In the angular position of the latch bail, shown in Fig. 27, which is also its angular position when seated, in a notch $Kb$, on top of the lug $Ka$ of a selection key in row D, the contacts LD remain closed. Upon depression of a selection key in row D, its cam lug $Ka$ momentarily rocks the latch bail of this row outwardly, causing it to momentarily open contacts LD for a purpose made clear in the circuit description. When release key RK, which is in row D, is operated, it also rocks the latch bail outwardly to open contacts LD, but in this case the latch bail stays in this position and contacts LD remain open as long as the release key is held down.

Means are provided to lock the selection keys and the release key KR against operation until the toggle switch MS (Fig. 48a) is turned on to permit voltage to be applied to the various circuits. This locking means also comes into effect each time a selection key in row D is depressed. It may be mentioned now that the final character selecting step is the operation of a selection key in row D and brings about the operation of the printing means. The depression of a key in row D will cause the selection keys of all the rows to be locked up until the printing operation is completed, so that no change in character selection may be initiated until the printing operation is completed. The locking means includes two lock bars 180L and 180R of which the former is associated with key rows A and B and the latter with key rows C and D. Each lock bar is slidably confined in the space left by the upper and lower center plates 154 and 155 between the vertical legs of the angle bars 152 and 153 of a key mounting frame. The lock bar is pivotally hung from parallel arms 181 and 182 pivoted on pins 183 carried by the key mounting frame. A spring 184 connects to arm 182 to urge the arm in a direction to maintain the lock bar in its locking position. In the locking position of the bar, it presents solid metal to pins 168a extending from the latch bails 168. With regard to the left hand keyboard section, lock bar 180L, when in locking position, has solid metal opposite the pins 168a of the latch bails 168 of rows A and B. With respect to the right hand keyboard section, lock bar 180R, when in locking position, has solid metal between the pins 168a of the latch bails 168 of rows C and D. The arm 182 associated with each lock bar has a forked extension which receives a pin 185 provided on the upper end of the plunger of a solenoid designated 186L (Fig. 20) for the left hand keyboard section and 186R (Fig. 23) for the right hand section. Upon energization of the solenoid, it rocks the arm 182 in a direction to move the lock bar horizontally parallel to itself into an unlocking position. In this unlocking position, holes 180a in the lock bar are in registry with the pins 168a of the latch bails, leaving the latch bails free to be moved by the selection keys and thus freeing the selection keys for depression or restoration. The circuit of solenoids 186 will be traced later.

*The carriage and paper feeding means*

Figure 42:
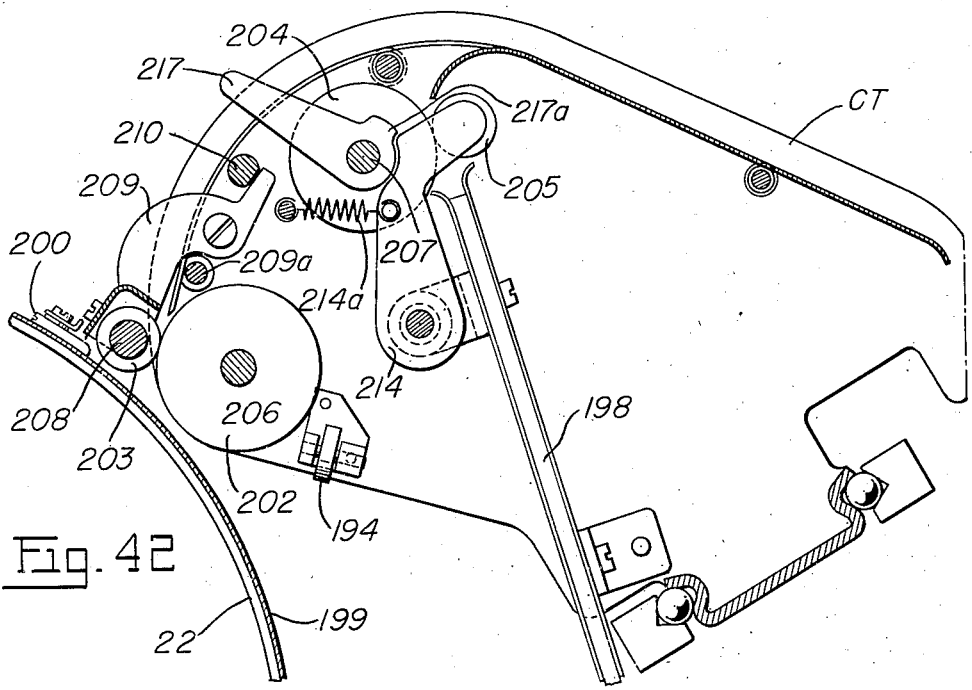
Fig. 42 is a section along lines 42—42 of Fig. 38.

The carriage CT (Figs. 1, 2 and 38 to 43) corresponds to a typewriter carriage and carries means adapted for feeding ordinary letter size sheets or long continuous form sheets. The carriage has conventional ball-bearing traction on a pair of rails 190 secured to upper surfaces of a sub-frame 191 (also see Figs. 3 and 28) and of end castings 10 and 11. The sub-frame 191 is fixed to the tops of a pair of standards 192 and 193 (Figs. 2 and 3) which are mounted between the rear casting 13 and the intermediate beam 14. Supplementary anti-friction support for the carriage is provided by a pair of ball-bearing rollers 194 (Figs. 37 and 42) mounted to each side of the carriage and riding on a pair of flat tracks 195 which are fixed into depressions 15a formed in the top of the cross beam 15 (see Fig. 3) at each side of the printing assembly.

A paper guide chute 198 is attached to the carriage CT. The lower portion of the chute is curved to detour around the printing assembly which is mounted to cross beam 15. The front of this cross beam is shaped as an upward continuation of the inner wall of the chute 198. A curved plate 199 (see also Fig. 5), riveted to a stiffener bar 200 which is secured to the end castings, serves as an upward continuation of the outer wall of the chute. The chute and its front continuations constitute a guide for a work sheet, designated w in Fig. 2. A front feed roll 202 and coacting pressure rolls 203 are above the front end of the paper guide. A rear feed roll 204 and coacting pressure rolls 205 are above the rear end of the paper guide. The front and rear feed rolls are fixed to shafts 206 and 207, respectively, which are journaled in the carriage sides. The pressure rolls are mounted for separation, at will, from the feed rolls to facilitate insertion of a work sheet. Thus, the front pressure rolls 203 are carried by a shaft 208 which is supported at opposite ends by levers 209 pivoted at 209a to the carriage sides. Coacting with the upper arms of the levers 209 is a rod 210 turnably supported by the carriage sides and to one end of which is fixed a finger 211. The rod 210 has flat portions engaged with the upper arms of levers 209 when the pressure rolls 203 are engaged with the feed roll 202. The operator may depress the finger 211 to turn the rod 210 so that the round portions of the rod will engage the upper arms of the levers 209 and rock them to disengage the pressure rolls 203 from the feed roll 204. Springs 212 (see Figs. 41 and 43) connect to the levers 209 to maintain the pressure rolls 203 either in the engaged or disengaged position. The rear pressure rolls 205 are on a rod 213 (see Fig. 2) which is carried at opposite ends by arms 214 (Figs. 38 and 48) freely mounted on studs 215 and 216 fixed to the carriage sides. Free on opposite ends of the shaft 207 of rear feed roll 204 are two finger levers 217. When the rear pressure rolls are to be disengaged from the rear feed roll, the operator moves both levers 217 upwardly, causing projections 217a thereof to cam against the arms 214 and rock the arms, and the pressure rolls, to the rear. The projections seat in recesses in the arms 214 at the end of the disengagement of the pressure rolls. Springs 214a connect to the arms 214 to maintain the pressure rolls in engaged or disengaged position.

As indicated in Figs. 38, 40 and 41, the front and rear feed rolls 202 and 204 are rigidly provided at the left with gears 218 and 219, respectively, which mesh with an intermediate gear 220. The gear 220 is riveted to a ratchet wheel 221, and the hub of the ratchet and gear assembly is rockably carried by the stud 215 fixed to the left side of the carriage. Rotatably carried by the hub of the ratchet and gear assembly is a pulley 223 to which is attached the carriage return tape 224. Rigid with the side of the pulley is an arm 225 carrying a pawl 226 urged by a spring 226a to engage the ratchet wheel 221. The pawl has a pin 226b engaged with a cam bump 227a on a line space selection lever 227. At the beginning of a carriage return operation, the tape 224 turns the pulley 223 clockwise (Fig. 41) against the resistance of a spring 228. Accordingly, the pawl 226 moves clockwise but its nose does not engage the ratchet wheel 221 until the pin 226b rides off the cam bump 227a. Thereafter, the pawl engages and turns the ratchet wheel, and attached gear 220, until the top edge of the pawl abuts a stop 229 fixed to the carriage. The tape 224 then effects the carriage return travel. At the end of the carriage return travel, the tape slackens, allowing the spring 228 to return the pulley 223 counterclockwise until arrested in initial position by engagement with stop 229 of a finger 225a on the arm 225 which is fixed to the pulley with the stop 229. The return of the pulley brings the pawl 226 back to its initial position. A detent 230, pivotally mounted to the carriage side, is urged by a spring 232 into engagement with a V-shaped lug 227b on the line space selection lever 227. In the double line-space position of the lever 227, the nose of detent 230 is against the right hand side of the lug 227b, as viewed in Fig. 40, and the left wall of a notch 227c in the lever is against one side of stop 229. When single line spacing is desired, the operator moves the lever 227 counterclockwise to bring the right wall of the notch 227c against stop 229. During this adjustment of the lever, its lug 227b cams past the nose of detent 230, which then engages the left side of the lug to maintain the lever in its new position. The position of the lever determines the position of the cam bump 227a with respect to the pin 226b and thereby determines the extent of actuation of the ratchet 221 and attached gear 220. Gear 220, through gears 218 and 219 simultaneously turns the front and rear feed rolls 202 and 204 to effect the vertical spacing of the work sheet. It may be mentioned that the rear feed roll 204 is rotatable at will by knobs 204a (Fig. 1) and through gears 219, 220, and 218 effects similar rotation of front feed roll 202.

Figure 43:
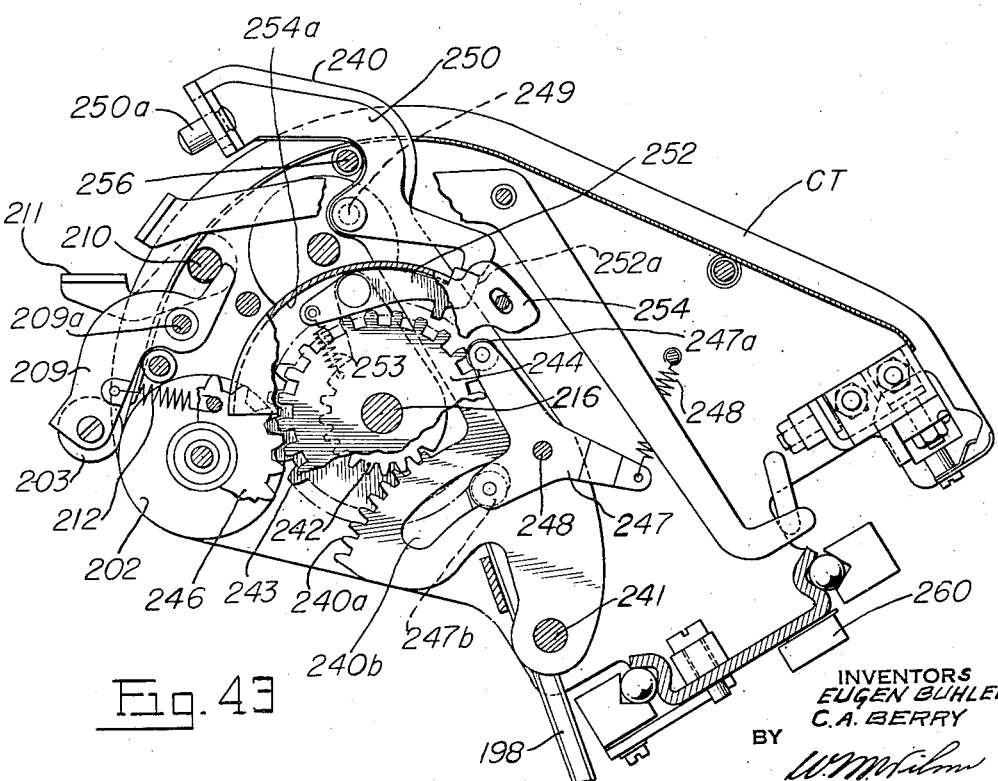
Fig. 43 is a section along lines 43—43 of Fig. 38.

The line of the sheet at printing position is seven single-line spaces or about 1¾ inches below a visible, erasure position. It may be desired to bring the line of the sheet which is at printing position to the visible position in order to view the characters printed on this line and to make erasures if necessary. Manually operable means are provided for this purpose, such means being called here the visible line positioning means. This means is operable to feed the sheet reversely exactly seven line spaces and to return the sheet in the forward direction exactly the same amount. Referring to Figs. 38 and 43, the visible line positioning means comprises a lever 240 pivoted to the right side of the carriage on a stud 241. The lever 240 is formed with gear teeth 240a meshed with a gear sector 242. The gear sector is free on the hub of a rigid assembly which includes gear 243 and detent wheel 244 and which is rotatable on the stud 216 secured to the right side of the carriage. Gear 243 is meshed with a gear 246 on front feed roll 202. Sprocket wheel 244 is engaged by a roller 247a provided on an arm of a detent 247 which is pivotally carried by a pin 248 fixed to the carriage side. The detent carries a second roller 247b which is seated normally in a rear cam depression of an arcuate slot 240b cut in lever 240. A spring 248 urges the detent in a direction to maintain its roller 247a engaged with gear 244 while the roller 247b is seated in the rear depression of slot 240b. Lever 240 also pivotally carries, on a stud 249, a sub lever 250. The levers 240 and 250 extend upwardly to the exterior of the carriage. At its upper end, the lever 250 is provided with a knob 250a which passes freely through a hole in the bent-over top of the lever 240. The lower end of lever 250 abuts a lug 252a on a pawl 252. The pawl is pivotally carried by an extension arm of gear sector 242 and has a tooth which is movable into an interdental space of wheel 244. A spring 253 connected between the rear arm of the pawl and the gear sector urges the pawl counterclockwise (Fig. 43).

Assuming that the paper line at printing position is to be brought to visible position, the operator presses against knob 250a of lever 250, rocking the lever clockwise about its pivot 249. Consequently, the lever 250 rocks the pawl 252 clockwise to bring its tooth into driving engagement with wheel 244. With the pawl in driving engagement, its lug 252a is below the bottom surface of an arcuate shield 254a integral with a plate 254 which is attached to the carriage side. After pressing on the knob 250a to rock the lever 250 clockwise, the operator's hand comes into engagement with the bent-over upper end of the lever 240 and effects clockwise action of the levers 240 and 250. Just as soon as lever 250 starts to move clockwise, the cam depression in slot 240b acts on the roller 247b to rock the detent 247 clockwise, thereby disengaging roller 247a from wheel 244. As clockwise movement of the lever 240 is continued by the operator, the slot 240b coacts with roller 247b to maintain the detent 247 disengaged. During the clockwise movement of the lever, its gear teeth 240a drive the gear sector 242, with paul 252, counterclockwise. As soon as the pawl, now in down position, starts to move counterclockwise, its lug 252a starts riding under the arcuate plate 254, whereby the pawl tooth 252b is positively kept in engagement with the gear 244. Consequently, with tooth 252b engaging the wheel 244, it drives this wheel and the connected gear 243 counterclockwise. Gear 243, being in mesh with gear 246 on the front feed roll 202, the latter will be turned clockwise, and through gears 218, 220, and 219 (Fig. 40) will effect similar actuation of the rear feed roll 204. The movement of the feed rolls in clockwise direction feeds the work sheet in a direction and to an extent such as to bring the line at printing position upwardly to the visible erasure position.

To bring the line, when at visible position, back to the printing position, the operator returns the levers 240 and 250 counterclockwise, to their initial positions. During such movement of the lever 240, its teeth 240a move the gear sector 242 and pawl 252 clockwise to turn the wheel 244 and gear 243 in the same direction. When these arrive at their original position, the lug 252a of the pawl leaves the shield 254a, allowing the spring 253 to disengage the pawl from the wheel 244. As this occurs, the cam depression in slot 240b again receives roller 247b, allowing spring 248 to return the detent into engagement with the wheel 244. The return of the gear 243 to its original position effects return of the feed rolls to their original positions and, hence, the sheet line previously at printing position is returned thereto.

It may be noted that the drive of wheel 244 and the gear 243 by the pawl 252 is necessarily the same in both directions, since the engagement and disengagement of the pawl occur at the same point defined by the rear edge of the arcuate plate 254a. Hence, the line of the work sheet will be moved exactly the same distance back to printing position as it was moved out of printing position. It should be noted, further, that the clockwise stroke of the lever 240 is limited by engagement of the left end of slot 240b with roller 247b of detent 247, while the return stroke of the lever is limited by its engagement with a stop stud 256. It is also to be noted that idle play of lever 240 is avoided by its engagement with roller 247b which is seated in the deep end of the notch 240b with spring pressure derived from spring 248.

The carriage CT also is provided with common appurtenances of a typewriter, including the escapement rack 260 (Fig. 38), the margin stop bar 261, the tab stop rack 262, and the carriage release levers 263. The machine also includes the several means operated under control of the six function keys referred to in the description of the keyboard. To repeat, these function keys (see Fig. 1) are the back space key BS, the character space key SP, the tab stop setting key TS, the tab stop clear key TC, the tabular spacing key TAB, and the carriage return key CR. Upon depression of a function key, it closes a circuit, traced later, for energizing a magnet which couples the function means to a power roller for operation thereby.

Referring to Figs. 2, 28 and 30 to 35, the power roller is designated 265 and is equivalent to the rubber-covered friction power roller of Patent No. 1,777,055, for example. The roller 265 is journaled in previously mentioned sub-frame 191 and is continuously rotated by gearing from the motor 55 (Fig. 18). As previously described in connection with the drive to the cam-toothed roller 135 (Figs. 2 and 5) which fires the printing hammer, there is a gear transmission between the motor-driven shaft 65 and the shaft 146 (see Fig. 4). Shaft 146, as seen in Fig. 2, is provided with a gear 266 meshed with a gear 267 on the power roller 265. In this manner, until the motor 55 is shut off, the power roller 265 is continuously rotated. Arranged for selective engagement with the power roller 265 are seven single lobe cams 269 of the general type disclosed in Patent No. 1,777,055 and two double lobe cams 270a and 270b of the general form also disclosed in the latter patent. The cams are momentarily engaged with power roller 265 under control of magnets generally designated M and mounted on brackets 271 fixed to the back wall of sub-frame 191. The circuits of these magnets will be traced later in the circuit description. Magnets M—TAB and M—TS are energized upon depression of keys TAB and TS (Fig. 1), respectively. Magnets M—TC and M—TCR are concurrently energized upon depression of key TC. Magnets M—DS and M—SS control cams 270a and 270b, respectively, and are selectively energized either as an incident to character printing or as a result of depression of character space key SP. Magnet M—RF is energized at the same time as the magnet M—SS or M—DS to effect feed of an ink ribbon. The means relating to the ink ribbon will be explained in the next section of the description. Magnet M—BS is energized upon depression of the key BS. Magnet M—CR is energized upon operation of key CR.

Each of the cams is pivotally carried by a separate bell crank plate lever 272. The levers 272 are freely mounted on a common rod. Referring to Fig. 33, a lever 274 is pivotally carried by a pin 275 on lever 272 and urged by a spring 276 to turn the cam in a direction to engage the power roller. Such action is normally prevented by a latch lever 277 free on pivot pin 275 and having its upper stop tab 277u engaged with a lug 278 formed on the cam element. The upper arm of the latch lever 277 is provided with a pin 277a which is engaged in the slotted end of an armature lever 279 of the related magnet, as shown in Fig. 34 in connection with magnet M—TAB. Upon energization of the magnet, it releases the latch lever from the cam, allowing the spring-pressed lever 274 to engage the cam with the power roller 265. As a result, the cam roller turns the cam and in so doing moves it outwardly to rock the bell crank lever 272, against resistance of a spring 280, in a direction to depress a link generally designated 282. The link is connected to the means for carrying out the function called for by energization of the particular magnet M. In a manner disclosed in Patent No. 1,777,055, the lower stop tab 277m of latch 277, if held out, engages lug 278 just short of a complete revolution of the cam and prevents more than a single revolution of the cam for each operation of the latch. It should be noted that with lug 278 against lower stop 277m of the latch 277, the cam is clear of the power roller 265. Upon the return of the latch to its stand-by position, tab 277m releases the cam for completion of its revolution, at which point its lug 278 stops against the upper tab 277. The foregoing describes the general action of the means controlled by a magnet M. In particular, the link 282 shown in Fig. 34 connects through a linkage 283 to tab spacing means such as disclosed in Patent No. 1,935,436. The linkage brought into action under control of magnet M—TS rocks a shaft 50p (Figs. 28 and 34) which carries the tab stop setting finger 52p. Elements 50p and 52p correspond to shaft 50 and finger 52 of Patent No. 2,157,053. The link 282 controlled by magnet M—BS rocks a lever 284 (Fig. 35) which operates back spacing mechanism such as disclosed in Patent No. 1,873,553. The link 282 controlled by magnet M—CR adjustably carries a block 285 for operating the toggle lever 286 of the carriage return and line spacing mechanism and corresponds to the link 73 of Patent No. 2,104,559 or to the link 75 of Patent No. 2,200,767. Link 282g also operates lever 287 (Fig. 35) which has the same function as the lever 78 of the last-mentioned patent. It may be mentioned that the assembly designated CRC in Fig. 28 is of the type shown in Patent No. 2,104,559 to the right of the frame designated 10 in the latter patent.

The cams 270a and 270b (see Fig. 28) are double lobe cams. The cam 270b is similar to cam 270a (Fig. 30) except that it has two diametrically opposite lugs 278, as in Patent No. 1,777,055, and thus will make half a revolution upon each release of its latch 277. Thus, each half of the cam 270b functions the same as a single lobe cam 269 and produces a single reciprocation of the link 282s (Fig. 36). The link 282s oscillates a lever 288 (also see Fig. 29) which has a shoulder engaged with an edge of a lever 289, whereby the latter also is oscillated. Connected to lever 289 is a link 290 for operating trip lever 291 for tripping escapement pawls (not shown) which cooperate with escapement rack 260. The escapement functions as in Patent No. 1,994,544, wherein link 10 and trip lever 9 correspond to link 290 and lever 291 of the present disclosure. The cam 270b is brought into operation upon energization of magnet M—SS which occurs when single character spacing is to be effected. Such single character spacing is effected when the characters in column 0 of the type cylinder 22 (Fig. 8) are being printed. During printing of characters from other columns of the type cylinder, double character spacing is effected. Such spacing is brought about by energization of magnet M—DS which unlatches the cam 270a (Fig. 30), whereupon the cam engages the power roller 265. The cam 270a is a double lobe cam with only a single stop lug 278. Hence, the cam will make a full revolution each time it is released by its latch. During this revolution, first one lobe and then the other lobe of the cam will reciprocate the link 282d (see Fig. 28). The link oscillates a lever 291 (also see Fig. 29) which acts similarly to lever 288 to cause oscillation of lever 289 to effect a character spacing movement. Since link 282d is given two reciprocations for each release of cam 270a, two successive character spacing movements will be produced. In short, each time magnet M—DS is energized, a double character spacing operation occurs.

When tab stop clearing is to be effected, magnets M—TC and M—TCR (Fig. 28) are concurrently energized. The magnet M—TC acts in a manner now understood to cause the related link 282 (Fig. 37) to be depressed. This link rocks a lever 299 clockwise, against resistance of a spring 300. The lever 299 is connected by a link 302 to the crank arm 303 of the tubular shaft 58p which has fixed to it the tab stop clearing cam finger 59p (also see Fig. 28). The shaft 58p and cam finger 59p correspond to parts 58 and 59 of Patent No. 2,157,053, and the cam finger effects restoration of a tab stop or stops in the manner explained in the latter patent. The lever 299 when rocked clockwise to produce the tab clearing operation is latched in position by engagement of a shoulder thereof with a latch 304 urged clockwise (Fig. 37) by its spring 304a. Consequently, the parts connected to the lever 299 are latched in operated position as long as the magnet M—TC is held energized by maintained depression of the tab stop clear key TC (Fig. 1).

At the same time as magnet M—TC operated to produce the tab clear operation, the magnet M—TCR was also energized and its armature lever rocked the cam latch 277c counterclockwise (Figs. 31 and 32). This latch 277c is of a special construction. It includes a lower stop tab 305 and an upper stop tab 306. In the stand-by position of the latch, the bottom tab 305 sits on the stop lug 278 of cam 269 and prevents movement of the cam into engagement with power roller 265. Upon energization of magnet M—TCR, the latch 277c is rocked counterclockwise, releasing the bottom stop tab 305 from stop lug 278 and placing the upper stop tab 306 in the path of the stop lug. Accordingly, the cam is rocked only a short distance by spring-pressed lever 274 before lug 278 abuts the upper stop tab 306. The cam is thereby stopped in a position in which it is still clear of the power roller 265. When key TC is released by the operator, magnets M—TC and M—TCR are deenergized, as will be brought out in the circuit description. Thereupon, latch lever 277c returns to its stand-by position, withdrawing its upper stop tab 306 from lug 278 of the related cam and thus allowing associated lever 274 to bring the cam into engagement with power roller 265. The cam is then rotated until its lug is stopped by the tab 305 of lever 277c. In consequence of the rotation of this cam, its carrying lever depresses a link 282c (Fig. 28) to rock a lever 308 (Fig. 37) clockwise. Thereupon a pin 308a on the lever 308 (also see Fig. 29) knocks the latch 304 off the shoulder of lever 299, allowing the spring 300 to restore the latter to its normal, unlatched position. The parts connected to the lever 299 and including tab stop clearing finger 59p (Fig. 28) likewise return to normal position.

The foregoing has described tab clear means which is latched positively in active status until the tab clear key is released by the operator, whereupon the tab clear means is positively unlatched and allowed to return to inactive status.

The ink ribbon feed

The ink ribbon PR (Figs. 2 and 46) is in the form of a carbon paper tape which is run through the machine only once. The ribbon supply roll is carried by a spool which is composed of several parts. Referring to Figs. 44 and 45, the spool includes a side plate 310, a hub 311 to which the side plate is fixed, and a bar 312 to which the hub is riveted. Bar 312 carries a pin 313 pivotally carrying a retaining plate 314 for the ribbon roll. Retaining plate 314 has an open slot 314a which fits over a reduced portion of the hub. The retaining plate is formed with a bent tab 314b engageable with a bent tab 310a on the side plate 310. When the retaining plate is in closed position, its tab 314b is held against tab 310a by reason of the upper end of the retaining plate having been snapped into engagement with the front of the transversely bent top 310b of the side plate. The upper end of plate 314 may be flexed past the end of 310a and then the plate swung to open position, shown in dot and dash lines in Fig. 45. With the retaining plate in open position, a ribbon roll may be removed or inserted.

The ribbon carrying spool is mounted in a pocket 12a formed in the central portion of the front casting 12 (see Figs. 2 and 3). One wall of this pocket is formed with a guideway 12b into which the bar 312 of the spool is slidably insertable to the position in which the bottom of a plate 315 fixed to the upper portion of bar 312, engages the top of the guideway 12b. A removable cover 316 is provided for the pocket 12a.

Means are provided to sense depletion of the ribbon roll. This means includes a roll follower 317 which is pivotally carried by the plate 315. A spring 318 urges the follower 317 towards the supply roll. When the supply roll is depleted, the follower has moved counterclockwise (Fig. 2) to such extent that a stud 317a thereon engages the insulated end of a contact blade 319 to close contacts 321. In a manner explained in the next section, the closure of these contacts results in the locking of the selection keys. A new ribbon supply roll will then have to be inserted as a preliminary condition to resuming operation of the machine.

The path of the ribbon from the supply roll is over a front strip 323 (Fig. 2) which is attached to a stiffener and then through a bar 324 secured to the end castings. The ribbon is led over this bar and the previously mentioned bar 200 and curved plate 199 (also see Fig. 5). As described before, plate 199 serves as a front, upward continuation of the paper chute 198. Thus, the ribbon lies on plate 199 between the type cylinder 22 and the work sheet w behind which is the striking end of the printing hammer 130, as shown in Fig. 2. It need hardly be mentioned that the plate 199 and the front wall of casting 15 which mounts the hammer assembly have alined openings through which the striking end of the hammer may move to coact with the type cylinder and ink ribbon to produce a character imprint on the work sheet. The ribbon is led downwardly from the plate 499, under an idler roller 325 and thence around a guide wheel 326 and between a feed roll 327 and coacting roll 328. From there, the ribbon is passed, through an opening in the rear cover plate 330, to the outside of the machine. It may be mentioned that a ribbon cover strip 331 is attached to the strip 323 so as to protect the ribbon.

Referring to Figs. 46 and 47, the ribbon guide wheel 326 and the ribbon feed wheel 327 are carried by a lever 335 which is rockably mounted on a bracket 336 attached to rear casting 13. The rockable mounting of the lever 335 is afforded by a tube 337 secured to the lever and freely surrounding a pin 338 extending from bracket 336. Tube 337 also serves as the support for the ribbon guide wheel 326. Lever 335 also is provided with a stud 339 for rotatably carrying the ribbon feed wheel 327. Rigid with the wheel 327 is a ratchet 327a which is engaged by the nose of a feed pawl 340. Pawl 340 is pivotally carried by a lever 341 which is freely mounted on a pin 342 extending from bracket 336. The pawl is urged clockwise relative to the lever 341 by a spring 343 between them. Another spring 344 connects the lower ends of levers 341 and 335 to each other. Spring 344 normally urges the lever 341 to its counterclockwise limit while urging lever 335 clockwise to maintain the feed roll 327 in pressure engagement with the coacting roll 328 which is mounted to bracket 336.

The upper end of lever 341 is slotted to receive a pin 345 provided at the lower end of a dependent extension 346 (also see Figs. 2 and 28) of the carrier 272 for the cam 269 controlled by magnet M—RF. As is evident from the preceding section of the description, this cam is engageable with the power roller 265 upon energization of the magnet M—RF. This magnet is energized as an incident to character spacing, in a manner explained in the next section of the description, dealing wtih the circuits. The engagement of the cam with power roller 265 produces a reciprocation of its carrier 272 which, through its extension 346, produces an oscillation of lever 341. Thereupon, the pawl 340 turns the ratchet 327a and the attached feed roll 327 to effect a step of advance of the ink ribbon PR. It may be noted that upon the clockwise, feed stroke of lever 341, the tension of spring 344 increases, in turn causing the feed roll 327 to increase pressure against roll 328, thus making ribbon feed more positive.

Means are provided to respond to an accidental break in the ink ribbon. This means includes an arm 350 pivoted at its upper end to bracket 336. The arm 350 is bent at its lower end to provide a finger 350a engageable with the portion of the ink ribbon between the guide wheel 326 and the feed roll 327. Rigidly attached to arm 350 is an insulating piece 351 which engages a spring metal contact blade 352 to keep contacts 353 open as long as there is tension on the ink ribbon. Should the ribbon break, its tension disappears, allowing arm 350 to be rocked counterclockwise (Fig. 46) by blade 352, with the result that contacts 353 close. Closure of these contacts results in the locking of the character selection keys in a manner brought out in the section which follows.

*Circuits and operation*

Referring to Fig. 48a, the machine is adapted to be plugged to a 110 v. A. C. supply. To bring the machine into operation, the operator closes switch MS. Motor 55 (also see Fig. 2) is set running and drives the type cylinder 22, the hammer firing roller 135, the power roller 265, etc. Closure of switch MS also applies the supply voltage to a rectifier which feeds D. C. potential to lines 400 and 401.

It may be assumed at the start that none of the keys are depressed. Also, it will be understood from the previous section on the keyboard that the keys are locked against operation before switch MS is closed, such locking being provided by lock bars 180L and 180R (Figs. 21 and 24) normally held by springs 184 in locking position. As soon as voltage is applied to lines 400 and 401, the lock bars are shifted to key release positions by solenoids 186L and 186R (Figs. 20 and 23) which are energized as follows (Fig. 48b):

*Solenoids 186L and 186R.*—Line 400, the normally closed side of relay contacts R3a, through parallel solenoids 186L and 186R, to line 401.

The drum latch release solenoid RS (see Figs. 2 and 12) is energized as soon as voltage is on lines 400 and 401 as follows (Fig. 48a):

*Solenoid RS.*—Line 400, through the solenoid and normally closed contacts a of relay R4 to line 401.

Solenoid RS releases latch 45 from rack 49, allowing type cylinder 22 (Figs. 2, 7 and 8) to be shifted transversely. When latch 45 is fully out of rack 49, it effects the reversal of status of contacts RSa and RSb; i. e., contacts RSa open while contacts RSb close. Upon closure of contacts RSb, a circuit makes as follows (Fig. 48a):

*Clutch solenoid 80L.*—Line 400, the normally closed side of contacts b of relay R1, through solenoid 80L and contacts RSb to line 401.

With clutch solenoid 80L (also see Fig. 18) energized, the type cylinder 22 is moved transversely towards the left (see Fig. 8), it being understood that directions are with reference to an observer at the front of the machine. In the leftward direction of the type cylinder, its columns pass the printing plane in ascending column number order, while in the opposite direction, the columns pass the printing plane in descending column number order.

The drum moves to the left now until left hand limit contacts LHS (Fig. 6) are closed. Thereupon, the following circuit is established (Fig. 48a):

*Relay R1 circuit #1.*—Line 400, the normally closed side of right hand limit contacts RHS (also see Fig. 6), the now-closed contacts LHS, through relay R1 and contacts RSb to line 401.

Relay R1 closes its stick contacts a which shunt contacts LHS, so that the relay will remain energized after contacts LHS open. Relay R1 also reverses its b contacts, so that the circuit of clutch solenoid 80L opens, while the circuit of clutch solenoid 80R makes as follows:

*Clutch solenoid 80R.*—Line 400, reversed contact b of relay R1, solenoid 80R, and contacts RSb of line 401.

With solenoid 80R (also see Fig. 12) energized, the drum is moved transversely to the right. As soon as the drum starts moving to the right, left hand limit contacts LHS reopen. The drum continues traveling towards the right until it reaches its right hand limit whereupon right hand limit contacts RHS are reversed. As a result, the stick circuit of relay R1 opens, and contacts b of the relay revert to their normal status. Consequently, the circuit of clutch solenoid 80L again makes, and the drum is again moved to the left.

In the foregoing manner, assuming none of the selection keys has been depressed, the drum moves transversely in alternate directions. In unison with such movement, the wipers 98 and 99 travel along the rings of emitter CE (also see Figs. 14 and 15).

Referring to Fig. 48a, ring a of CE is a common ring connected by wiper 98 to ring b. Ring b has six contact segments of which five are each equivalent in length to the lateral span of ten drum columns while the remaining segment has a length equivalent to the lateral span of four drum columns. Ring c is similar to ring b. Ring d has fifty-four unit segments corresponding to the fifty-four columns of the type cylinder 22 (see Fig. 8). The segments of rings b and c are engaged by their wipers in unison with the transverse travel of the related groups of drum columns across the printing plane. For instance, the segments 50—53 are traversed by their wipers during the travel of the group of drum columns 50 to 53 across the printing plane. Each segment of ring d is engaged by wiper 98 as a corresponding drum column is at the printing plane. For example, segment 0 is engaged by its wiper while drum column 0 is at the printing plane.

It has been explained previously that each column has one-hundred character positions. Hence, the four columns 50 to 53 have 400 character positions which are given the call numbers 5000 to 5399. Columns 40 to 49 have 1000 character positions given the call numbers 4000 to 4999. Columns 30 to 39 have 1000 characters with call numbers 3000 to 3999, and so on for the other groups of columns. Further, in column 50, the characters have call numbers from 5000 to 5099; in column 31, the characters have call numbers between 3100 to 3199, and so on. The selection keys of row A select the thousands order digit of the call number. Hence, such selection amounts to a selection of a group of columns having characters whose call numbers have a common thousands order digit. Thus, the key 0 in row A selects the group of columns 0 to 9, key 1 in row A selects the group of columns 10 to 19, and so on. The selection keys of row B select the hundreds order digit of the call number and such selection amounts to the selection of one of the columns of a group selected by the key in row A, since such column has 100 characters whose call numbers have a common thousands order digit and a common hundreds order digit.

The function of rings a and b of emitter CE is to serve in conjunction with the key contacts a of row A to determine the nearest direction in which the drum must move upon a change in the thousands order digit of the call number. Such change would be, for example, if the drum column 23 were in the printing plane and a selection was made of a column in the group of columns 10 to 19. The characters in column 23 have call numbers 2300 to 2399 while the characters in a column of groups 10 to 19 have call numbers with a thousands order digit 1. Hence, if the column 23 is in the printing plane and the key 1 in row A is depressed, the drum should be moved to the right (Fig. 8), which is the nearest direction for bringing the column group 10 to 19 to the printing plane from their previous position. But, if with column 23 in the printing plane, the key 3 in row A is depressed, the drum will be moved to the left which is the nearest direction for bringing column group 30 to 39 to the printing plane from their previous position. It should be noted that the directions left and right are indicated in Fig. 8 and in the circuit diagram, Fig. 48a, by letters L and R, respectively.

If there is a change in call number of less than 1000; that is, if the thousands order digit of the call number is not changed but the hundreds order digit is changed, the previously depressed A row key is left undisturbed but a different selection key in row B is depressed. The rings a and b of emitter CE serve in conjunction with key contacts b of row D and the key contacts of row B to determine the nearest direction in which the drum must move to bring the selected column of the previously selected column group to the printing plane. The rings a and b of CE also serve with the b contacts of row D and the key contacts a of row B to detain the drum with the selected column rotating in the printing plane. It is clear, then, that emitter CE has both a direction determining and column finding function in conjunction with the keys of rows A and B.

The manner in which the above results are obtained will now be specifically described. Assume that while the drum is moving to the left and the group of columns 50 to 53 is crossing the printing plane, the operator depresses key A—0. Since the drum is moving to the left, relay R1 is in deenergized status and clutch silenoid 80L is energized. Upon the reversal of key contacts A—0a, the following circuit is established (Fig. 48a):

Relay R1 circuit #2.—Line 400, common ring a of CE, wiper 98, segment 50—53 of ring b, serially via the normal sides of key contacts A—4a, A—3a, A—2a, and A—1a and the reversed contacts A—0a to wires 402 and 403, thence through relay R1 and contacts RSb to line 401.

Relay R1 reverses its contacts b, whereupon solenoid 80L is deenergized, while solenoid 80R is energized. Accordingly, the drum immediately starts moving to the right, which is the nearest direction for bringing the drum from its column positions 50 to 53 to the column positions 0 to 9, selected by depressed key A—0.

If, instead of depressing key A—0, any of the keys A—1, A—2, A—3, or A—4 are depressed, the same result would ensue. The first reversed a contacts of the keys in row A relating to column groups of lower number than the column group crossing the printing plane would direct the voltage transmitted to the emitter rings a and b to wire 402 and thence to the relay R1.

In further explanation, assume that while the drum is moving to the left and its group of columns 30 to 39 are traversing the printing plane, the operator depresses the A row key 2. The circuit of relay R1 would then be routed from segment 30—39 of ring b through the reversed contacts A—2a to wire 402, and thence through relay R1. Thus, the drum, instead of continuing to move to the left, in ascending column number direction, would be reversed to move to the right, which is the nearest direction to shift it from column group position 30 to 39 to column group position 20 to 29 selected by depressed key 2 of row A.

It is evident from the circuit diagram that if the drum is moving to the left and the A row key is depressed which selects the group of columns then traversing the printing plane, that the a contacts of this key will have no effect and the relay R1 circuit # 2 will not make. As will be made clear presently, under this condition the change in direction of the drum travel will depend upon which of the B row keys is depressed.

The reversal of drum travel from left to right under control of rings *a* and *b* of emitter CE and the A keys has been explained. It may also be pointed out that if the drum is moving to the left and the operator depresses an A key which selects a group of columns higher in number than the group traversing the printing plane, then the drum will continue to move to the left since there will be no circuit path closed to wire 402. For instance, if columns 20 to 29 are traversing the printing plane while the drum is moving to the left and the operator depresses key A—3, the circuit of relay RI will not make since the normally closed sides of contacts A—1a and A—9a do not lead to wire 402.

The reversal of direction of drum movement from right to left will be considered in the following discussion of several column selections made by keys in rows A and B.

Assume that while the drum is moving to the right and the group of columns 20 to 29 is crossing the printing plane, the operator depresses key 1 in row A. Since the drum is moving to the right, relay RI and clutch solenoid 80R are in energized status. The depression of key 1 in row A completes relay RI circuit #2 but since the relay is already energized, there is no change and the drum continues to move to the right. Assume, further, that the operator then depresses key 2 in row B. The drum continues moving to the right until the wiper 99 of emitter CE engages the 12 segment of ring *d* of CE. Thereupon, a circuit is established as follows:

*Relay R4.*—Line 400, key contacts A—1b (now closed owing to depression of A row key 1), the connecting wire 404 to segment 10—19 of ring *c* of emitter CE, the wiper 99, the segment 12 of ring *d* of CE, the now-reversed key contacts B—2a, the common wire 405, and through relay R4 to line 401.

Relay R4 opens its contacts *a*, breaking the circuit of latch solenoid RS. The latch 45 thereupon moves into a notch of rack 40, stopping the type cylinder with column 12 at the printing plane. As the latch starts to move into the drum arresting position, contacts RSb reopen while contacts RSa reclose. With contacts RSb open, the common return circuit path of clutch solenoids 80L and 80R and of relay RI is broken. Accordingly, transverse drive of the drum in either direction ceases just as the detention of the drum by latch 45 is about to occur.

It is clear from the foregoing that the depression of keys A—1 and B—2 selects drum column 12 to be detained in the printing plane.

Assume, now, that the operator leaves the key 1 in row A down and depresses key 0 in row B, these two keys selecting drum column 10. The depression of key B—0 releases the previously latched down key 2 in row B, in a manner explained in the section on the keyboard. Accordingly, contacts B—2a revert to normal, so that the circuit, traced above, through relay R4 opens. Relay contacts *a* of relay R4 reclose, causing the circuit of solenoid RS to be reestablished. The solenoid withdraws latch 45 from rack 40, freeing the drum for transverse travel. When latch 45 is withdrawn, contacts RSb reclose. Since the key A—1 is still down and the wiper 98 now is on segment 10—19 of ring *b* of CE, the relay RI circuit #2 does not make. Instead, another circuit through relay RI makes as follows:

*Relay RI circuit #3.*—Line 400, the still-closed key contacts 1b of row A, the connecting wire 404, segment 10—19 of ring *c* of CE, wiper 99, the 12 segment of ring *d*, the now-restored key contacts 2a of row B, thence via the normal side of key contacts 1b of row B and the now-reversed key contacts 0b of row B to common wire 406. Wire 406 is connected to wire 403, so that the circuit of relay RI is completed via wire 403, relay RI and now-closed contacts RSb to line 401.

With relay RI energized and contacts RSb closed, the circuit of clutch solenoid 80R is established. Accordingly, the type cylinder is moved transversely to the right from its previous column 12 position to its newly selected column 10 position. It will be noted from Fig. 8 that this is the nearest direction of type cylinder to shift its transverse position from column 12 to column 10. When the cylinder reaches column 10 position, the circuit of relay R4 again makes. This circuit is the same as the one previously traced through R4 except that it is routed through segment 10 of ring *d* of emitter CE and the now-reversed key contacts B—0a. With relay R4 energized, transverse shift of the type cylinder is arrested.

Assume that with keys A—1 and B—2 depressed and the drum arrested in its column 12 position, the operator had depressed key 5 in row B instead of key 0 in this row. In that case, the relay RI circuit #3 would not make. A path can be traced from the 12 segment of ring *d* of CE, through the now-normal key contacts B—2a, thence serially via the normal sides of key contacts B—1b and B—0b but no further since the normal side of B—0b is disconnected from wire 406. Also, a path may be traced from key contacts B—2a serially through the normal sides of key contacts B—2b, B—3b, and B—4b to the now-reversed key contacts B—5b but since the latter are reversed, the circuit is open at this point. Neither can the relay RI circuit #2 be made, for reasons already clear. Hence, with relay RI deenergized, the circuit of clutch solenoid 80L is made, causing the type cylinder to be moved to the left (Fig. 8) from its 12 column position towards the newly selected 15 column position. It is to be noted that this is the nearest direction in which the cylinder should travel to change from its 12 column position to its 15 column position.

Assume that with drum column 15 in the printing plane, the operator depresses key 0 in row A and leaves key 5 of row B depressed. With keys A—0 and B—5 down, the selection is of drum column 5, and the drum should move to the right. Since the brush 98 is now on segment 10—19 of ring *b* of emitter CE and key A—0 has been depressed, a circuit similar to the relay RI circuit #2 is ready to be established via this segment and the reversed key contacts A—0a as soon as latch contacts RSb close which will occur upon withdrawal of latch 45 from rack 40. For this to be done, the solenoid RS must be energized which is, in turn, dependent upon the deenergization of relay R4. The circuit of relay R4 has been routed, before the release of key 1 in row A, through key contacts 1b of row A. Upon depression of key 0 in row A, the key 1 in this row is restored and its *b* contacts open, so that the circuit of relay R4 breaks. Accordingly, solenoid RS is energized, latch 45 releases the drum, and contacts RSb close. Thereupon, the relay RI circuit #2 makes, followed by the energization of clutch solenoid 80R. Hence, the drum will be shifted to the right from the position in which column 15 was at the printing plane to the position in which newly selected column 5 is at the printing plane.

The manner in which the selection of a column of the drum is carried out under control of emitter CE and the keys of rows A and B has been explained. It has been pointed out that the drum is automatically moved in the nearest direction from its previous column position to its newly selected column position. It is also clear now that the keys of rows A and B choose the first two left hand digits of the call number and this leads to the result of singling out one of the fifty-four drum columns and positioning it in a printing plane.

Each drum column has 100 possible types and these may be divided into ten groups of ten and arbitrarily named the 0 group, 1 group, and so on to the 9 group. The keys of row C select the tens order digit of a call number of a character and this leads to the selection of one of the ten groups of types of any of the fifty-four drum columns at the printing plane. The keys in row D select the units order digit of the call number and have the effect of singling out one of the types of any group of ten chosen by the keys of row C. The operation of a key in row D is the final step of manual selection of a character and results in the automatic printing of the character from the singled-out type as it crosses the printing position during rotation of the drum. As will be brought out, printing of a character cannot occur, even though a key in row D is depressed, unless the latch 45 is engaged in a notch of rack 40 and detaining the drum against transverse movement. Means are also provided to insure that printing of a selected character is effected before the operator can depress other selection keys to make a new selection. Further, means are provided to prevent repeat printing of the same character upon maintained manual depression of a key in row D. The manner in which these results are accomplished will now be explained in detail with reference to Fig. 48b as well as Fig. 48a.

As shown in Fig. 48b, the keys of row C operate contacts a which are arranged to connect a common wire 410 selectively to the ten segments t (also see Fig. 8) of the emitter PE. The wiper 47 of this emitter is in continuous common rotation with the type drum, as described before, and successively engages the t emitter segments 0 to 9 in unison with the successive rotation across the printing position of the corresponding groups of ten types of any selected one of the drum columns detained at the printing plane. Associated with each of the t segments is a group of ten u emitter segments which are successively connected by wiper 47 to the t segment. Thus, there are one hundred u segments in all, corresponding to the hundred types in each drum column. The similarly positioned u segments of the ten groups of such segments are wired to the same a key contacts of row D. For instance, the first u segments 0, 10, 20, etc. of the ten groups are wired to the key contacts D—0a.

It is seen now that the depression of a key in row C selects one of the segments t of the emitter and its associated group of ten segments u while a key in row D selects one of the segments u of the selected group. The net effect is to provide the required timing, with respect to the revolution of the drum, of the printing operation. Printing, however, does not occur until certain precedent conditions are satisfied. One such condition is that the latch 45 be in engagement with rack 40 and detaining a drum column in the printing plane. The other condition is the energization of relay R3 (Fig. 48b) which must reverse its contacts R3a to enable the circuit of the print magnet PM to be completed. Relay R3 is energized, under control of the b contacts of the keys in row D, by the following circuit (Fig. 48b):

*Relay R3.*—Line 400, the common of one side of the b key contacts of the D row, via the closed one of these contacts to the common of the other side of these b key contacts, thence via a wire 411, the normally closed side of contacts a of relay R2, and through relay R3, and contacts LD to line 401.

The contacts LD (also see Fig. 27) are momentarily opened upon depression of a selection key in row D and held open as long as the release key RK, also in row D, is depressed, as previously described. Since it is a selection key in row D which has been depressed, the contacts LD were opened only momentarily and now have reclosed to enable the above circuit through relay R3 to be established.

Relay R3 reverses its contacts R3a to partially close the printing magnet circuit. The reversal of these contacts also results in the opening of the circuit (the first one traced) of lock bar solenoids 186L and 186R. Accordingly, the lock bars 180L and 180R (Figs. 21 and 24) shift to locking positions to prevent change in the setting of the selection keys of rows A, B, C, and D. The lock bars will not be returned to release positions until after the printing of the selected character has been completed. In this manner, once a D row selection key has been depressed as the final step in the selection of a character, a change in setting is prevented until the selected character has been printed. This is desirable in order to prevent such change from interfering with the proper timing for the printing of the already selected character.

Assuming that latch 45 is in a notch of rack 40, the contacts RSa (Fig. 48a) are now closed. With relay contacts R3a reversed and contacts RSa closed, a circuit is established through print magnet PM when the wiper 47 of emitter PE reaches the selected u segment. Assuming, for example, that keys C—1 and D—2 have been depressed, the circuit of magnet PM is as follows:

*Print magnet PM.*—Line 400 (Fig. 48b), the reversed contacts R3a, wire 410, contacts C—1a, the 1 segment t, wiper 47, the 12 segment u, the key contacts D—2a, wire 412, the normally closed side of contacts b of relay R2, through printing magnet PM to a wire 413 (continue with Fig. 48a), thence via contacts RSa to line 401.

Concurrently with the circuit through magnet PM, a circuit is completed through relay R2.

*R2 relay pick up circuit.*—As in the preceding circuit to wire 412, thence through relay R2 to wire 413 and, as before, to line 401 by way of contacts RSa.

Magnet PM unlatches hammer 130 (Figs. 2 and 5) which is then fired by cam-toothed roller 135 as the selected type moves across the printing position, in the manner described in the section on the printing means. The magnet PM acts almost instantaneously to unlatch hammer 130 after which it is deenergized as a result of the reversal of the relay contacts b of the relay R2, the circuit of which has been traced above. A repeat circuit through magnet PM cannot be made until relay R2 is deenergized. Relay R2 is held energized by the following circuit:

*R2 relay hold circuit.*—Line 400 (Fig. 48b), now-closed key contacts D—2b, wire 411, reversed contacts b of relay R2, thence through R2 to line 413 (also see Fig. 48a) and contacts RSa to line 401.

Thus, even if the operator should keep the depressed D row selection key down by force, repeat printing under control of a single operation of this key will not be effected.

When relay R2 was energized, it reversed its a contacts. Consequently, the circuit of relay R3 is broken and contacts R3a return to normal condition. One effect of this is to open the pick up circuit of relay R2 and another effect is to reestablish the circuit of solenoids 186L and 186R, the consequence of which is to unlock the selection keys of rows A, B, C, and D.

The reversal of the R2 relay contacts a also establishes a circuit through the release key operating solenoid RKM (Fig. 23), as follows (Fig. 48b):

*Release key solenoid RKM.*—Line 400, the closed one of the b contacts of the D key row, to wire 411, the reversed contacts a of relay R2, wire 414, through solenoid RKM, to wire 415, and through contacts LD to line 401.

The solenoid RKM depresses the release key RK (also see Fig. 26), causing the restoration of the previously depressed D selection key. In this manner, automatic resetting of the D row of selection keys is effected after each printing operation.

The release key contacts b close upon depression of the release key. These contacts are in shunt with the b contacts of the selection keys of row D and maintain the hold circuit of relay R2 closed. When the release key is depressed, it rocks the latch bail 168 of the D row, whereupon contacts LD open to break the circuit of the release key solenoid RKM. Contacts b of the release key reopen, so that relay R2 is deenergized. It will be noted that the b contacts of the release key take any arc resulting from the opening of the circuit of relay R2.

Each printing operation is followed by stepping of the ink ribbon PR (Fig. 2) and character spacing of the work sheet. These actions are controled by the relay R2 which is energized concurrently with energization of the print magnet PM. It may be stressed that the printing hammer is fired with extreme rapidity and printing occurs almost instantaneously before relay R2 succeeds in shifting the status of its relay contacts. If necessary, the relay R2 may be made slightly slower acting than the print magnet PM.

Relay R2 closes its c contacts (Fig. 48a) to enable the circuit of magnet M—RF (also see Fig. 28) to make. As described in the section on the ink ribbon PR and its feed, the energization of magnet M—RF produces a step of feed of the ink ribbon.

The relay R2c contacts also complete either a circuit through magnet M—DS or magnet M—SS (also see Fig. 28) depending on whether characters of drum columns 1 to 53 or of drum column 0 (Fig. 8) have been selected for printing. Column 0 contains the English characters, the Arabic numbers, punctuation marks, etc. while the remaining columns contain the Chinese characters. When the characters of column 0 are being typed, single character spacing is effected. But when the characters of the remaining columns are being printed, double character spacing is effected. As previously described, when column 0 is in the printing plane, the right hand limit contacts RHS (Fig. 6) are in reversed status but when any of the remaining columns is in the printing plane, these contacts are in normal status. With contacts RHS in normal status, the circuit of magnet M—DS is made from line 400 (Fig. 48a), via the normally closed side of contacts RHS, through magnet M—DS and via contacts c of now-energized relay R2, to line 401. When contacts RHS are in reversed status, they route the circuit through magnet M—SS. In the manner described in the section on the carriage and paper feed means, energization of magnet M—DS results in double character spacing while energization of magnet M—SS results in single character spacing.

The selection keys of all the rows will be locked if the ink ribbon supply is exhausted or if the ink ribbon breaks. As prevously described in he section on the ink ribbon, the contacts 321 (Fig. 2) close when the ink ribbon supply is exhausted. As also described, if the ink ribbon should break, the contacts 353 (Fig. 46) will close. If either contacts 353 or 321 close, a circuit is completed from line 400 (Fig. 48b), through either of these contacts to line 411, thence via the normal side of contacts a of relay R2, through relay R3 and contacts LD to line 401. Relay R3 reverses contacts R3a, breaking the circuit of soenoids 186L and 186R, which results in the locking of all the selection keys.

The circuits of magnets M—BS, M—TAB, M—TS, M—TC, M—TCR and M—CR (Fig. 28) are shown in Fig. 48b. It is evident that operation of a function key BS, TAB, TS, or CR (Fig. 1) will close its contacts a to establish the circuit of the related magnet. Energization of such magnet brings about the performance of the function selected by the function key, in the manner described in the section on the carriage and paper feeding means. Closure of contacts a of key TC closes the circuit of magnets M—TC and M—TCR which are in parallel and relate to the tab stop clearing function.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A machine comprising a type drum provided with a plurality of columns of types, impression-taking means to coact with a type in any selected column, drive mechanism for effecting axial movement of the drum in one direction so as to produce transverse, relative shift in this direction between the columns and the impression-taking means, alternatively effective drive means for effecting axial movement of the drum in the opposite direction so as to produce such shift in the opposite direction, column-position representing means operable concomitantly with the axial shifting of the type drum, and column selecting means operating in conjunction with the column-position representing means for rendering one or the other of the drive mechanisms effective according to the nearest direction in which the transverse shift will bring the selected column and the impression-taking means into alinement.

2. A machine comprising a plurality of columns of types, impression-taking means to coact with a type in any selected column, drive means including alternatively engageable clutches for effecting transverse relative shift between the columns and the impression-taking means in either of opposite directions, an emitter operable by the drive means concomitantly with such transverse shift, column selecting means, and circuits controlled thereby and by the emitter for selectively engaging either clutch so as to produce the transverse shift in a desired direction.

3. A machine comprising a plurality of columns of types, impression-taking means to coact with a type in any selected column, drive means for effecting transverse, relative shift between the columns and the impression-taking means, an emitter operable by the drive means according to said transverse shift, column selecting means, and circuits controlled thereby and by the emitter for governing the extent of the transverse shift so as to present the selected column to the impression-taking means.

4. A machine comprising a plurality of columns of types, impression-taking means to coact with a type in any selected column, drive means for effecting transverse, relative shift between the columns and the impression-taking means, an emitter operable concomitantly with and according to the extent of transverse shift, column selecting means, and arresting means controlled by the emitter and the column selecting means for arresting the transverse shift when a desired column is presented to the impression-taking means.

5. A machine comprising columns of recording elements, a device coacting therewith to effect recording on a sheet, drive means for effecting transverse, relative shift between the columns and said device, an emitter operable correspondingly with the transverse shift, column selecting means, and circuits controlled by the emitter and the column selecting means for so controlling the extent of said transverse, relative shift as to present the desired column to the recording device.

6. A machine such as defined in claim 5, said drive means being effective to produce the relative shift in either of opposite directions, and said circuits controlling the direction as well as extent of the shift.

7. A machine comprising a carrier for columns of recording elements, a device coacting with the recording elements to effect recording on a work sheet, drive means for shifting the carrier transversely to said device to position a desired column in a recording plane, an emitter operable concomitantly with the carrier, column selecting means, and means controlled by the emitter and the selecting means for governing the extent of transverse shift of the carrier.

8. A machine comprising a cylinder bearing columns of types, a printing hammer for striking a type in a selected column, drive means for shifting the cylinder axially to bring a desired column to the printing plane, an emitter operable concomitantly with the axial shift of the cylinder, column selecting means, and circuits controlled by the emitter and the selecting means for governing the amount of axial shift of the cylinder.

9. A machine comprising a carrier for columns of recording elements, a recording device to coact therewith, drive means for effecting transverse shift of the carrier to bring a desired column to a recording plane, a single arresting element for arresting the carrier after transverse shift thereof to any variable extent, column selecting means, and means controlled thereby for bringing the arresting means into effect to arrest the transverse shift when the desired column is in the recording plane.

10. A machine comprising a carrier for columns of recording elements, a recording device to coact therewith, drive means to effect transverse shift of the carrier, a latch engageable with the carrier to arrest its transverse shift, and means so mounting the latch as to enable it upon engagement with the carrier to be moved thereby to a limited extent in the direction of transverse shift of the carrier.

11. A machine such as defined in claim 10, and yielding means for resisting such transverse movement of the latch.

12. A machine such as defined in claim 10, said drive means being operable to effect the transverse shift of the carrier in either of opposite directions and said latch being engageable with the carrier to arrest its transverse shift in either of the opposite directions, and shock-absorbing centralizing means resisting said transverse movement of the latch and returning it to a central position.

13. A machine such as defined in claim 10, said drive means being operable to effect the transverse shift of the carrier in either of opposite directions, said latch being mounted for transverse, limited movement in either direction under the impetus of the carrier, and centralizing means resisting the transverse movement, in either direction, of the latch and returning it to a central position.

14. A machine comprising a carrier for columns of recording elements, a recording device coacting therewith, means to drive the carrier transversely relative to the device to bring a desired column into a recording plane, arresting means engageable with the carrier to arrest its transverse movement, and means for preventing operation of the drive means while the arresting means is engaged with the carrier.

15. A machine such as defined in claim 14, said drive means including clutchable means for effecting the transverse drive of the carrier in one direction and alternatively clutchable means for effecting the transverse drive of the carrier in the opposite direction, and means for preventing the clutching-in of either clutchable means until the arresting means is disengaged from the carrier.

16. A machine comprising a carrier for columns of recording elements, drive means for producing transverse shift of the carrier to bring a desired column to a recording plane, arresting means normally engaged with the carrier to detain it against transverse shift, column selecting means, and magnetic means controlled thereby for releasing the arresting means from the carrier to allow its transverse shift.

17. A machine such as defined in claim 16, said drive means including an electromagnetic clutch, and means controlled by the arresting means upon its release for establishing a circuit of the clutch to bring the drive means into operation for producing the transverse shift of the carrier.

18. A machine comprising a carrier for columns of recording elements, drive means including a clutch for driving the carrier transversely to bring a desired column to a recording plane, column selecting means, and means controlled thereby for engaging and disengaging said clutch so as to limit the period of clutch engagement in accordance with the extent of transverse drive required to bring the desired column to the recording plane.

19. A machine comprising a carrier for columns of recording elements, releasable drive means for effecting transverse shift of the carrier to bring a desired column to a recording plane, a set of selecting elements operable to select any of different groups of columns, another set of selecting elements operable to select any column in a selected group, and means controlled by both sets of selecting elements for effecting the release of the drive means with respect to the carrier when the desired column arrives at the recording plane.

20. A machine comprising a carrier for recording elements, means to effect drive of the carrier in either of opposite directions, means to select a recording element, means controlled thereby for selecting the direction of drive of the carrier, means also controlled by the selecting means for arresting the drive of the carrier when a selected element is located within a recording plane, said carrier, upon failure of the arresting means to function, being driven to a limit position, and means thereupon effective to reverse the direction of drive of the carrier.

21. A machine comprising columns of recording elements, a coacting recording device, a set of selecting elements for selecting groups of columns, another set of elements for selecting columns within the groups, drive means for effecting relative shift between the columns and said device in either of opposite directions to present a selected column to the device, and means controlled by the group selecting elements upon selecting a new group for determining the direction of said relative shift and further controlled by the column selecting elements upon selecting a new column in the same group for also determining the direction of said shift.

22. A machine comprising columns of recording elements, a coacting recording device between which and the columns transverse shift is produced to present a desired column to the device, a single arresting means for the transverse shift, a magnetic means energized to release the arresting means during the transverse shift, and means to deenergize the magnetic means and allow the arresting means to arrest the transverse shift as the selected column is presented to the device.

23. A machine comprising a continuously rotating shaft, a type cylinder mounted thereon for continuous rotation with the shaft and also for axial travel along the shaft, a cradle straddling the cylinder and restricted to movement parallel to the shaft and upon such movement effecting axial travel of the cylinder without interfering with its continuous rotation, a rack provided on the cradle, a gear meshed with the rack and turnable to effect the movement of the cradle and, thereby, the axial travel of the cylinder, type selecting means, means controlled thereby for governing the extent of axial travel of the cylinder so as to locate the column, bearing the selected type, in a printing plane, and means controlled by the selecting means during continuous rotation of the cylinder for thereafter making an impression from the selected type upon a work sheet.

24. A machine comprising a type cylinder bearing columns of types, a shaft upon which the cylinder is mounted to rotate with the shaft and also to travel axially relative to the shaft, a cradle straddling the cylinder and restricted to linear movement along the shaft and upon such movement producing the axial travel of the cylinder, a rack provided on the cradle, a latch engageable with the rack teeth to arrest the movement of the cradle and, thereby, arrest the axial travel of the cylinder, column selecting means, and means controlled thereby for releasing the latch from the rack during axial travel of the cylinder in bringing a selected column to a printing plane.

25. A recording machine including groups of columns of recording elements, a coacting recording device, drive mechanism to effect variable, transverse relative movement between the columns and the device, an emitter operating in unison with said transverse relative movement, a set of group selecting switches, a set of column selecting switches, a circuit closed under control of said emitter and under further conjoint control of an operated group selecting switch and an operated column selecting switch as a selected column in a selected group is presented for coaction with the recording device, and electrical means thereupon controlled by the circuit for arresting said transverse movement.

26. A recording machine including groups of columns of types, a printing hammer for striking a selected type in a selected column of a selected group to make an imprint on a work sheet, mechanism to effect relative transverse movement between the columns and the hammer, mechanism to effect movement of the columns in the column direction to present a selected type to the hammer, an emitter operating in unison with said transverse movement, another emitter operating in unison with the movement of the columns in the column direction, a set of group selectors, each to select a group of columns, a set of column selectors, each to select corresponding columns of the groups, other selectors for selecting corresponding types of the columns, a circuit jointly controlled by the first mentioned emitter and by the operated column and group selectors for controlling the first named mechanism to present a selected column of a selected group to the printing hammer, and a circuit jointly controlled by the second mentioned emitter and said other selectors for firing the hammer as the selected type in the selected column of the group reaches the printing position.

27. A recording machine including groups of columns of recording elements, a recording device to coact with an element of a selected column, mechanism to effect transverse relative movement between the columns and said device in order to present a selected column to the device, an emitter operating in unison with said transverse relative movement, a set of group selectors, a set of selectors for corresponding columns within the groups, and combinational circuits selectively closed under the control of the emitter and under the further conjoint control of both sets of selectors for governing operation of said mechanism to cause it to present the selected column in the selected group to the recording device.

28. A recording machine including groups of columns of recording elements, a coacting recording device, mechanism for effecting variable transverse relative movement between the columns and the recording device to present a selected column in a selected group to the device, a set of group selectors, a set of column selectors, a combinational circuit network including groups of circuit paths, each path in each group being connected in common with a corresponding path in each of the other groups to an individual column selector, each group of paths being connected to an individual group selector, whereby the group selectors and the column selectors operate in conjunction to single out an individual path in an individual group of paths, an emitter operating in unison with the aforesaid transverse movement for timing the closure of the singled-out circuit path to occur as the selected column in the selected column group is presented to said recording device, and means controlled by the closed circuit path upon its closure for interrupting said transverse movement.

29. A recording machine or the like including groups of columns of elements, mechanism for effecting variable, transverse movement of the groups of columns relative to an operating plane, a set of group selecting switches, a set of column selecting switches, commutating means operating in unison with the transverse movement of the groups of columns and including successive contact portions for connecting the group selecting switches successively into circuit as successive groups of said columns traverse the operating plane, said commutating means also including other contact portions for connecting each column selecting switch successively with the different group selecting switches as corresponding columns of the different groups traverse the operating plane, a circuit closed through said commutating means and operated column and group selecting switches when the commutating means effects the connection of the operated group selecting switch into the circuit and also effects the connection of the operated column selecting switch to the operated group selecting switch, and means rendered effective by closure of said circuit for arresting the transverse movement of the columns, whereby a selected column of a selected group is presented to the operating plane.

EUGEN BUHLER.
CHRISTOPHER A. BERRY.

REFERENCES CITED

The following references are of record in the file of this patent:

UNITED STATES PATENTS

| Number | Name | Date |
|---|---|---|
| 336,725 | Lasar | Feb. 23, 1886 |
| 657,153 | Barron | Sept. 4, 1900 |
| 904,982 | McKeever | Nov. 24, 1908 |
| 1,021,835 | Harry | Apr. 2, 1912 |
| 1,220,844 | Hiltz | Mar. 27, 1917 |
| 1,247,585 | Shah | Nov. 20, 1917 |
| 1,599,794 | Smith | Sept. 14, 1926 |
| 1,688,380 | Dorsey | Oct. 23, 1928 |
| 1,767,721 | Trew | Jan. 24, 1930 |
| 1,961,644 | Sampson | June 5, 1934 |
| 2,067,821 | Bell | Jan. 12, 1937 |
| 2,080,966 | Griffith | May 18, 1937 |
| 2,093,545 | Bryce et al. | Sept. 21, 1937 |
| 2,105,731 | Graves et al. | Jan. 18, 1938 |
| 2,323,388 | Fitch et al. | July 6, 1943 |
| 2,329,129 | Mehan | Sept. 7, 1943 |
| 2,408,780 | Kao | Oct. 8, 1946 |
| 2,412,777 | Kao | Dec. 17, 1946 |